(12) United States Patent
Cho

(10) Patent No.: US 7,889,037 B2
(45) Date of Patent: Feb. 15, 2011

(54) MAGNETIC LEVITATION SLIDING STRUCTURE

(75) Inventor: Se-hoon Cho, Gwangju-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 86 days.

(21) Appl. No.: 12/009,522

(22) Filed: Jan. 18, 2008

(65) Prior Publication Data

US 2008/0174392 A1 Jul. 24, 2008

(30) Foreign Application Priority Data

Jan. 18, 2007 (KR) ........... 10-2007-0005818

(51) Int. Cl.
*H01F 7/02* (2006.01)
*H01F 7/08* (2006.01)
*H01F 7/00* (2006.01)
*H01F 7/20* (2006.01)
*H04M 1/00* (2006.01)

(52) U.S. Cl. ............ 335/306; 335/222; 335/229; 335/285; 335/302; 455/575.4; 361/756

(58) Field of Classification Search ......... 335/205–207, 335/222, 229, 285, 302–303, 306; 455/575.1, 455/575.4; 361/755–756
See application file for complete search history.

(56) References Cited

U.S. PATENT DOCUMENTS

| 7,269,451 | B2 * | 9/2007 | Kwon ............... 455/575.4 |
| 7,423,506 | B2 * | 9/2008 | Terasaki ........... 335/306 |
| 2003/0005851 | A1 * | 1/2003 | Post ............... 104/281 |
| 2005/0000059 | A1 * | 1/2005 | Sung et al. ......... 16/320 |
| 2005/0009581 | A1 * | 1/2005 | Im et al. ........... 455/575.4 |
| 2005/0059443 | A1 * | 3/2005 | Pan et al. .......... 455/575.4 |
| 2005/0079902 | A1 * | 4/2005 | Chen et al. ........ 455/575.4 |
| 2007/0028797 | A1 * | 2/2007 | Poole .............. 104/307 |
| 2008/0051163 | A1 * | 2/2008 | Kim et al. ......... 455/575.4 |
| 2008/0119250 | A1 * | 5/2008 | Cho et al. ......... 455/575.4 |
| 2008/0125200 | A1 * | 5/2008 | Park et al. ........ 455/575.4 |
| 2008/0139261 | A1 * | 6/2008 | Cho et al. ......... 455/575.4 |
| 2008/0223249 | A1 * | 9/2008 | Studer ............. 104/284 |

FOREIGN PATENT DOCUMENTS

KR 1020050037649 A 4/2005
KR 1020050089584 A 9/2005

OTHER PUBLICATIONS

Kim et al., U.S. Appl. No. 11/888,541, filed Aug. 1, 2007.
Cho et al., U.S. Appl. No. 11/891,791, filed Aug. 13, 2007.
Cho, U.S. Appl. No. 11/891,985, filed Aug. 14, 2007.
Cho et al., U.S. Appl. No. 12/011,407, filed Jan. 25, 2008.

* cited by examiner

*Primary Examiner*—Elvin G Enad
*Assistant Examiner*—Mohamad A Musleh
(74) *Attorney, Agent, or Firm*—Drinker Biddle & Reath LLP

(57) ABSTRACT

A low friction and stable sliding structure for an electronic device is provided. The sliding structure includes a first sliding member comprising at least one guide portion, a second sliding member including a receiving portion receiving the guide portion so as to slide along the first sliding member, a first magnet portion disposed in the guide portion, such that magnetic poles of the first magnet portion are arranged across a sliding direction, and a second magnet portion disposed in the receiving portion so that a repulsive force can act between the first magnet portion and the second magnet portion.

19 Claims, 17 Drawing Sheets

MAGNETIC LEVITATION SLIDING STRUCTURE

CROSS-REFERENCE TO RELATED PATENT APPLICATION

This application claims the benefit of Korean Patent Application No. 10-2007-0005818, filed on Jan. 18, 2007, in the Korean Intellectual Property Office, the disclosure of which is incorporated herein in its entirety by reference.

BACKGROUND OF THE INVENTION

1. Field of the Invention

The present invention relates to a sliding structure for an electronic device, and more particularly, to a low friction and stable sliding structure for an electronic device.

2. Description of the Related Art

As sliding structures have the advantages of simple handling and attractive design, they are largely used in portable electronic devices such as cellular phones, cameras, portable multimedia players (PMP), electronic dictionaries, electronic schedulers, navigations, small-sized notebook computers or the like. FIG. 1A is a schematic perspective view illustrating a conventional cellular phone 10, and FIG. 1B is a schematic side view illustrating the conventional cellular phone 10 of FIG. 1A and a sliding structure 40 thereof.

Referring to FIGS. 1A and 1B, the conventional cellular phone 10 having the sliding structure 40 further includes a receiver portion 20 including a displaying portion 2 and a transmitter portion 30 including an operation-key portion 3 such as number key buttons or the like. The conventional cellular phone 10 is used by pushing up the receiver portion 20 for calling or transmitting/receiving of messages, and includes the sliding structure 40 used for a sliding operation. A semi-automatic sliding operation is preferably used. In a manual sliding operation, a user must go through the inconvenience of pushing the sliding structure 40 and handling the cellular phone 10 so as to open and close the sliding structure 40. In the conventional cellular phone 10, since the size of the transmitter portion 30 including a number key portion formed thereon, which is generally exposed by sliding, is small, an area which is required for operation-keys for performing various functions in addition to the number key is small. Thus, an additional button is formed on the receiver portion 20 on which a display portion is formed, and a button for performing functions, or the like is formed on a side surface portion of the cellular phone 10. Accordingly, a user must undergo the inconvenience of operating operation-keys that are spaced apart from one another to perform different functions. In addition, the arrangement uses a flexible printed circuit board (FPCB), which connects the operation key to an additional electronic device for operating the operation keys.

The conventional sliding structure 40 will now be described. Referring to FIG. 1B, the conventional sliding structure 40 is disclosed in Korean Patent Publication No. 10-2005-0037649 and includes a first sliding member 41 and a second sliding member 42 that slides along the first sliding member 41. The first sliding member 41 includes a first magnet 43 and the second sliding member 42 includes a pair of second magnets 44a and 44b, and thus a sliding operation is assisted by a magnetic force.

In the conventional sliding structure 40, friction between the first sliding member 41 and the second sliding member 42 impedes the sliding operation. In particular, the friction between the first sliding member 41 and the second sliding member 42 increases during a sliding operation when an attractive force act between the first magnet 43 and the pair of second magnets 44a and 44b. Accordingly, a user needs to push the sliding structure 40 harder in order to operate the conventional cellular phone 10.

FIG. 1C is a cross-sectional view illustrating another conventional sliding structure 50. Referring to FIG. 1C, the sliding structure 50, disclosed in Korean Patent Publication No. 10-2005-0089584, includes a first sliding member 51 and a second sliding member 52 sliding along the first sliding member 51.

The first sliding member 51 includes a first magnet 53 having a horseshoe shape, and the second sliding member 52 includes a second magnet 54 also having a horseshoe shape. The first magnet 53 and the second magnet 54 are alternately arranged to facilitate a sliding operation.

In the sliding structure 50, repulsive forces act between the N pole of the first magnet 53 and the N pole of the second magnet 54, and between the S pole of the first magnet 53 and the S pole of the second magnet 54 when a sliding operation is being performed. Simultaneously, an attractive force also acts between the S pole of the first magnet 53 and the N pole of the second magnet 54. Accordingly, a sliding operation does not proceed smoothly since a user will need to push the sliding structure 50 harder due to the attractive force between the first magnet 53 and the second magnet 54.

In addition, in the sliding structure 50, since the first magnet 53 and the second magnet 54, which have horseshoe shapes, are alternately arranged, a large space for such an arrangement is required, and thus the thickness of the sliding structure 50 is increased. Also, in curved parts where parts of the first magnetic member 53 and the second magnetic member 54 do not overlap, since an attractive force, instead of a repulsive force, acts between the parts of the first magnetic member 53 and the second magnetic member 54, the sliding operation cannot be easily performed, and the sliding stroke is reduced.

SUMMARY OF THE INVENTION

The present invention provides a low friction and stable sliding structure for an electronic device, in which the sliding structure has a relatively long sliding stroke.

Accordingly, an embodiment of the present invention provides a sliding structure for an electronic device. The sliding structure includes a first sliding member including at least one guide portion, a second sliding member including a receiving portion receiving the guide portion so as to slide along the first sliding member, a first magnet portion disposed in the guide portion, such that magnetic poles of the first magnet portion are arranged across a sliding direction, and a second magnet portion disposed in the receiving portion so that a repulsive force can act between the first magnet portion and the second magnet portion. The receiving portion may have a ⌐ cross-sectional shape or a substantially similar shape. Second magnet portions may be configured to be a pair, and the second magnet portions may face each other, and magnetic poles of the second magnet portions are arranged across a sliding direction.

The first magnet portion and the second magnet portions may be positioned so that magnetic poles of the first magnet portion and the second magnet portions, which have the same polarity, face each other, and thus a repulsive force acts between the first magnet portion and the second magnet portions. Second magnet portions may be configured to be a pair, and the second magnet portions may face each other. Also, magnetic poles of the second magnet portions are arranged perpendicular to a sliding direction, and opposite to each other, and thus a repulsive force may act with respect to one of magnetic poles of the first magnet portion.

The first magnet portion and the second magnet portion may be disposed so that an imaginary line, which connects facing surfaces of the second magnet portion, may always pass through at least a part of the first magnet portion throughout an entire sliding operation. When a length between the first magnet portion and the second magnet portion is at a maximum, the first magnet portion and the second magnet portion may be disposed so that a repulsive force is generated between the first magnet portion and the second magnet portion during a sliding operation of the sliding structure.

The sliding structure may also include at least one ferromagnetic member disposed on the guide portion and spaced apart from the first magnet portion in a direction parallel or substantially parallel to a sliding direction. The sliding structure may further include at least one ferromagnetic member disposed in the receiving portion and spaced apart from the second magnet portion in a direction parallel or substantially parallel to a sliding direction. The sliding structure may include a magnetic shield disposed in the receiving portion. The sliding structure may further include a magnetic shield disposed on at least a part of a surface of the second magnet portion. The first magnet portion may include a plurality of magnets, and the second magnet portion may include a plurality of magnets. Also, at least a part of the receiving portion may be formed of a ferromagnetic substance.

BRIEF DESCRIPTION OF THE DRAWINGS

The above and other features and advantages of the present invention will become more apparent by describing in detail exemplary embodiments thereof with reference to the attached drawings, in which.

DETAILED DESCRIPTION OF THE EMBODIMENTS

Hereinafter, exemplary embodiments of the invention will be described with reference to the attached drawings.

Figure 1A:
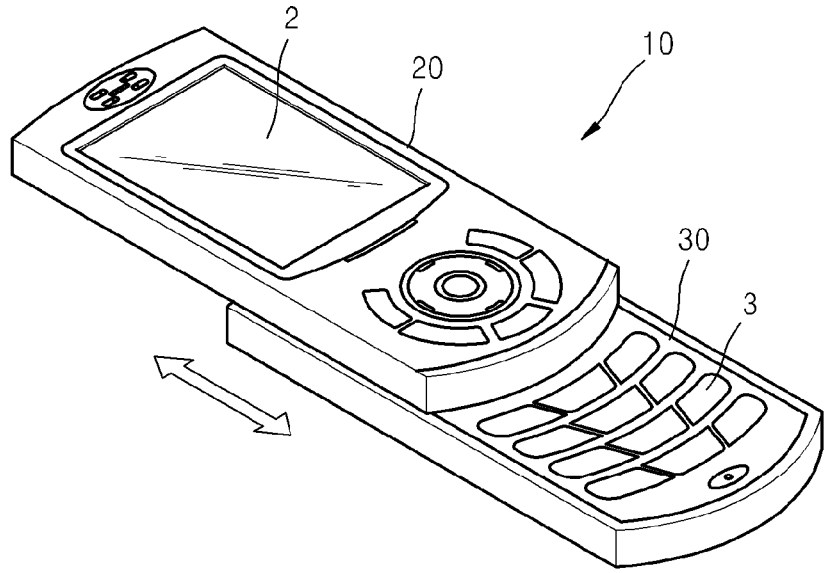
FIG. 1A is a schematic perspective view illustrating a conventional cellular phone having a sliding structure.
Figure 1B:
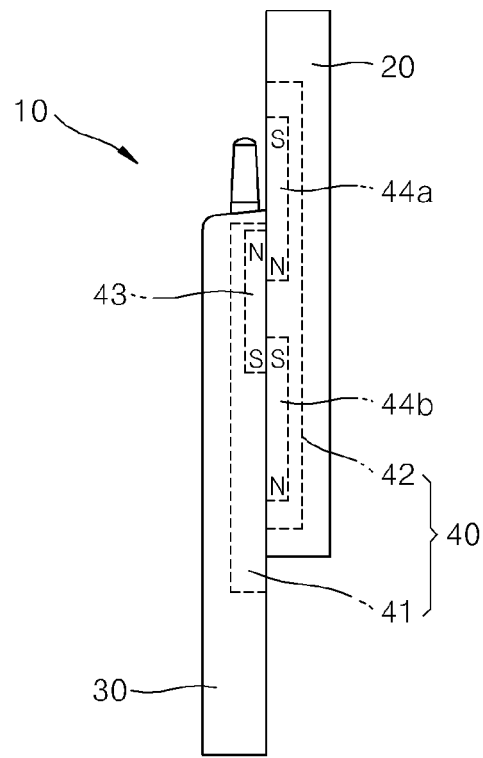
FIG. 1B is a schematic side view illustrating the conventional cellular phone of FIG. 1A.
Figure 1C:
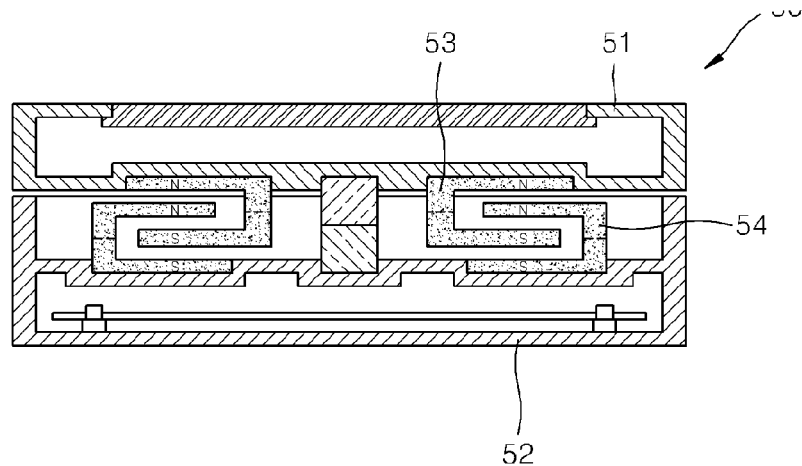
FIG. 1C is a cross-sectional view illustrating another conventional sliding structure.
Figure 2:
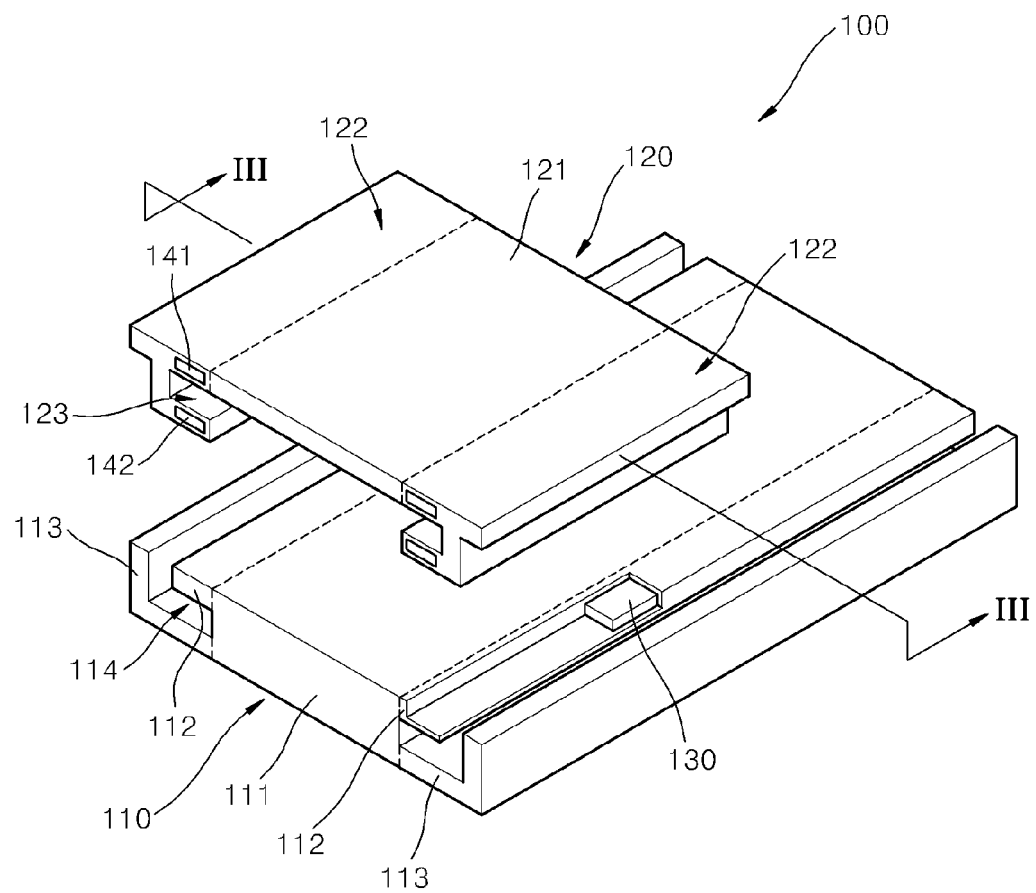
FIG. 2 is a perspective view illustrating an example of a sliding structure according to an embodiment of the present invention.
Figure 3:
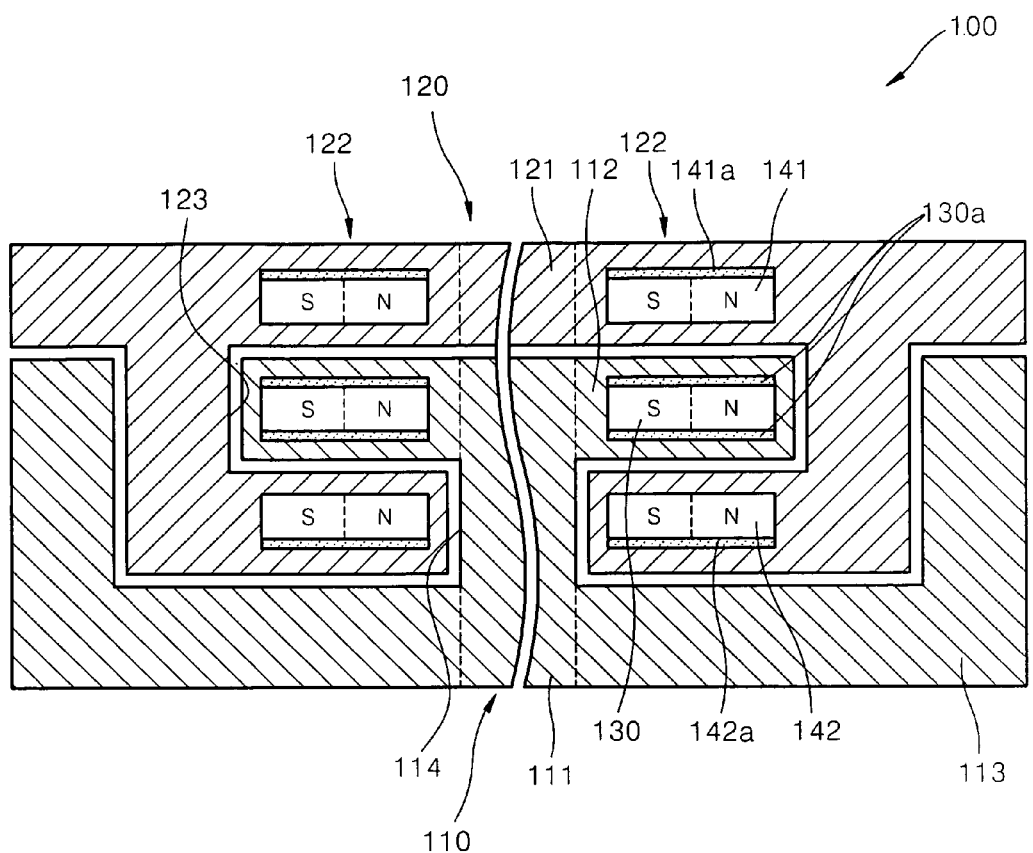
FIG. 3 is a cross-sectional view of the sliding structure taken along a line III-III of FIG. 2.
Figure 4:
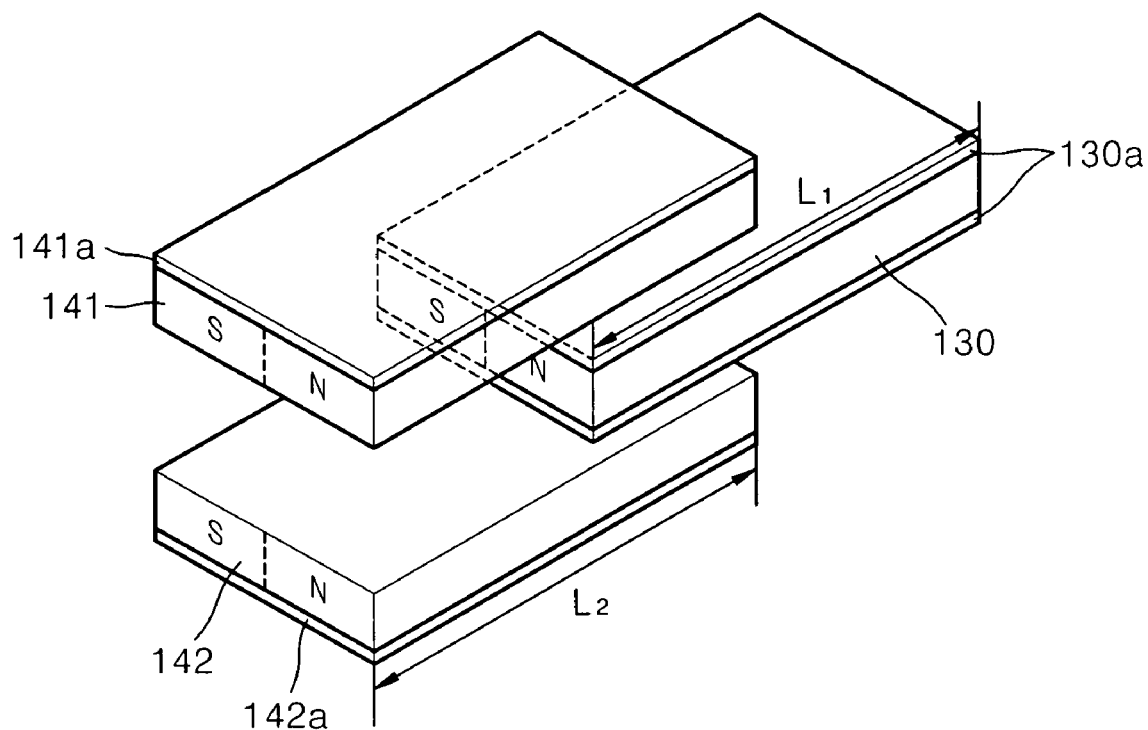
FIG. 4 is a schematic perspective view illustrating the arrangement of a first magnet portion, and second magnet portions in the sliding structure shown in FIG. 2, according to an embodiment of the present invention.

FIG. 2 is a perspective view illustrating a sliding structure 100, according to an embodiment of the present invention. FIG. 3 is a view of the sliding structure 100 taken along a line III-III of FIG. 2. FIG. 4 is a schematic perspective view illustrating the arrangement of a first magnet portion 130, and second magnet portions 141 and 142 in the sliding structure 100, according to an embodiment of the present invention.

Referring to FIGS. 2 and 3, the sliding structure 100 includes a first sliding member 110, a second sliding member 120, the first magnet portion 130 and the second magnet portions 141 and 142. The first sliding member 110 is formed of a non-magnetic material such as an aluminum alloy and includes a support portion 111, a guide portion 112, and an auxiliary receiving portion 113. In this example, the support portion 111 has a flat or substantially flat shape. The guide portion 112 extends from two sides of an upper part of the support portion 111.

The auxiliary receiving portion 113 extends from two edges of lower sides of the support portion 111, is spaced a predetermined distance from the guide portion 112, and has a ⌐ or substantially ⌐ shape. A first receiving groove 114 is defined by the auxiliary receiving portion 113 and the guide portion 112.

Although the auxiliary receiving portion 113 extends from the support portion 111, the present invention is not limited to this arrangement. That is, the auxiliary receiving portion 113 may not extend from the support portion 111. The support portion 111, the guide portion 112, and the auxiliary receiving portion 113 may be manufactured by using various methods such as a die casting method or a method in which a flat or substantially flat material is bent and plastic-deformed, however the present invention is not limited to these methods.

The second sliding member 120 is formed of a non-magnetic material such as an aluminum alloy or a magnesium alloy, or a ferromagnetic substance such as a tin steel plate or stainless steel, and includes a base portion 121 and a receiving portion 122. The first sliding member 110 and the second sliding member 120 are formed of an aluminum alloy, but the present invention is not limited to this material. For example, the first sliding member 110 and the second sliding member 120 may be formed of a plastic resin or a magnesium alloy, or may be formed of different materials. The base portion 121 has a flat or substantially flat shape, and the receiving portion 122 extends from two sides of the base portion 121. The receiving portion 122 has a ⊏ or substantially ⊏ shape, and a second receiving groove 123 is formed inside the receiving portion 122. Since the guide portion 112 is inserted into the second receiving groove 123 when the sliding structure 100 is assembled, the guide portion 112 functions as a sliding guider. In addition, since a part of the receiving portion 122 is inserted into the first receiving groove 114 when the sliding structure 100 is assembled, the receiving portion 122 functions as a sliding guider. The base portion 121 and the receiving portion 122 may be manufactured by using various methods such as a die casting method or a method in which a flat or substantially flat material is bent and plastic-deformed, but the present invention is not limited to these methods.

A lubricant may be coated on a surface of the guide portion 112, an inner surface of the receiving portion 122, an inner surface of the auxiliary receiving portion 113 or the like in order to further reduce friction during a sliding operation. For example, a ceramic material may be coated on a portion with which contact can occur during a sliding operation. The first magnet portion 130 may be embedded in the guide portion 112.

The first magnet portion 130 in this example is a permanent magnet, but the present invention is not limited to this type of magnet. That is, the first magnet portion 130 may be an electromagnet, or the like.

The first magnet portion 130 may be embedded in the guide portion 112, but the present invention is not limited to this arrangement. The first magnet potion 130 may be mounted on a surface of the guide portion 112 or in a groove formed in the surface of the guide portion 112. The first magnet portion 130 is mounted on a middle part of the sliding stroke of the guide portion 112 as illustrated in FIG. 2, in order to facilitate the sliding operation.

Referring to FIG. 4, a length "$L_1$" of the first magnet portion 130 may be equal to a length "$L_2$" of each of the second magnet portions 141 and 142, but the present invention is not limited to this arrangement. That is, the length "$L_1$" of the first magnet portion 130 may be any length, and the lengths "$L_1$ and $L_2$" of the first magnet portion 130 and each of the second magnet portions 141 and 142 may be different according to a sliding stroke. The first magnet portion 130 has a square or substantially square shape, and magnetic poles of the first magnet portion 130 are arranged across the sliding direction.

An arrangement of the magnetic poles of the first magnet portion 130 is the same as that of magnetic poles of each of the second magnet portions 141 and 142, which correspond to the magnetic poles of the first magnet portion 130, and thus the first magnet portion 130, and the second magnet portions 141 and 142 are arranged so that the magnetic poles thereof having the same polarity may face each other during the sliding operation. A magnetic shield 130a is mounted on an upper surface and a lower surface of the first magnet portion 130. The magnetic shield 130a is formed of a non-magnetic material, and shields magnetic lines of force generated by the first magnet portion 130.

The magnetic shield 130a is mounted on upper and lower surfaces of the first magnet portion 130, but the present invention is not limited to this arrangement. That is, the magnetic shield 130a may be further mounted on a side surface of the first magnet portion 130. In addition, the magnetic shield 130a may be mounted on a part of the guide portion 112 in which the first magnet portion 130 is mounted, instead of on a surface of the first magnet portion 130. In such a case, the magnetic shield 130a is placed on an appropriate part of the guide portion 112, and then the first magnet portion 130 may be mounted on the guide portion 112.

The magnetic shield 130a is formed of a non-magnetic material, but the present invention is not limited to this material. That is, according to the present invention, the magnetic shield 130a may be formed of a ferromagnetic substance (e.g., an AD-MU alloy or a tin steel plate), a diamagnetic substance or the like.

The magnetic shield 130a is formed on the first magnet portion 130, but the present invention is not limited to this material. That is, according to the present invention, the magnetic shield 130a may not be formed on the first magnet portion 130, according to the arrangement and form of the sliding operation of the first magnet portion 130 and the second magnet portions 141 and 142.

The second magnet portions 141 and 142 are configured to be a pair, and are embedded in the receiving portion 122, wherein the guide portion 112 is disposed between the second magnet portions 141 and 142. The second magnet portions 141 and 142 may each be a permanent magnet, but the present invention is not limited to this type of magnet. That is, according to the present invention, the second magnet portions 141 and 142 may each be an electromagnet, or the like. The second magnet portions 141 and 142 are embedded in the receiving portion 122, but the present invention is not limited to this arrangement. That is, according to the present invention, the second magnet portions 141 and 142 may be mounted on a surface of the receiving portion 122.

The second magnet portions 141 and 142 are configured to be a pair, but the present invention is not limited to this arrangement. That is, according to the present invention, each of the second magnet portions 141 and 142 may have any number and any shape so that a repulsive force may act between the first magnet portion 130 and each of the second magnet portions 141 and 142. For example, the second magnet portions 141 and 142 may be integrated to have a ⊏ or substantially ⊏ shape, i.e., a singular structure, and magnetic poles may be respectively arranged on inner and external parts of the singular structure.

Each of the second magnet portions 141 and 142 has a square or substantially square shape. The magnetic poles of each of the second magnetic portions 141 and 142 are arranged across the sliding direction, as the magnetic poles of the first magnet portion 130 are arranged across the sliding direction.

An arrangement of the magnetic poles of each of the second magnet portions 141 and 142 is the same as that of the magnetic poles of the first magnet portion 130, and thus a repulsive force acts between each of the second magnet portions 141 and 142 and the first magnet portion 130. That is, the magnetic poles of each of the second magnet portions 141 and 142 are arranged so that a repulsive force may act between each of the second magnet portions 141 and 142, and the first magnet portion 130, in order to facilitate the sliding operation.

The first magnet portion 130, and the second magnet portions 141 and 142 are arranged so that a perpendicular imaginary line, which connects surfaces of the second magnet portions 141 and 142, which face each other, passes at least a part of the first magnet portion 130 throughout the entire sliding operation. As a result of this structure, a repulsive force always acts between the first magnet portion 130 and each of the second magnet portions 141 and 142. Accordingly, friction is minimized when the second sliding member 120 including the second magnet portions 141 and 142 slides along the first sliding member 110 including the first magnet portion 130 since the second sliding member 120 is lifted from a surface of the first sliding member 110 due to a repulsive force. In such a case, the degree of lifting is related to the magnetic force and distance between the first magnet portion 130 and each of the second magnet portions 141 and 142, the effect of the magnetic shield 130a or the like. The magnetic force is related to the size, property and magnetization direction of the magnet used.

In this embodiment, the first magnet portion 130, and the second magnet portions 141 and 142 are arranged so that the perpendicular imaginary line, which connects the surfaces of the second magnet portions 141 and 142, which face each other, passes at least a part of the first magnet portion 130 throughout the entire sliding operation, but the present invention is not limited to this arrangement. That is, according to the present invention, the perpendicular imaginary line may not pass through the first magnet portion 130. That is, although the first magnet portion 130 is not disposed between the second magnet portions 141 and 142, since a slight repulsive force acts between side surfaces of the first magnet portion 130 and each of the second magnet portions 141 and 142, the sliding operation can be smoothly performed. Accordingly, in the sliding structure 100, the sliding operation can be performed over a long sliding distance.

Magnetic shields 141a and 142a are respectively disposed on the second magnet portions 141 and 142. Since the materials and functions of the magnetic shields 141a and 142a are the same as those of the magnetic shield 130a, a detailed description of the magnetic shields 141a and 142a will be omitted here.

The magnetic shields 141a and 142a are arranged on a upper surface of the second magnet portion 141 and a lower surface of the second magnet portion 142, but the present invention is not limited to this arrangement. In addition, the magnetic shields 141a may be disposed on a part of the receiving portions 122 in which the second magnet portions 141 and 142 are received, instead of on surfaces of the second magnet portions 141 and 142. In such a case, the magnetic shields 141a and 142a is disposed in an appropriate part of the receiving portion 122, and then the second magnet portions 141 and 142 are disposed in the receiving portion 122. In addition, according to the present invention, when the magnetic shields 141a and 142a are not used, and the receiving portion 122 is formed of a ferromagnetic substance, the second magnet portions 141 and 142 may be arranged so that the receiving portions 122 can function as a magnetic shield.

One magnet constitutes each of the first magnet portion 130, and the second magnet portions 141 and 142, but the present invention is not limited to this arrangement. That is, according to the present invention, a plurality of magnets may constitute each of the first magnet portion 130, and the second magnet portions 141 and 142. In such a case, magnetic poles of the magnets constituting each of the first magnet portion 130, and the second magnet portions 141 and 142 are arranged across the sliding direction, and the magnets spaced apart from one another are disposed in the sliding direction. Accordingly, it is easier to prevent a permanent magnet that is relatively sensitive to an impact from being broken than the case where a single magnet is used, and the sliding structure 100 can operate smoothly even if the sliding structure 100 is deformed or warped.

In the sliding structure 100, one of the first sliding member 110 and the second sliding member 120 is embedded in a primary body in which a main chip set of an electronic device such as a cellular phone, a camera, a portable multimedia play (PMP) or the like, and an electrical portion such as a battery are integrated, and the other member of the first sliding member 110 and the second sliding member 120 is embedded in a secondary body having a relatively simple structure. Accordingly, the sliding operation of the sliding structure 100 is performed. When the sliding structure 100 having the above structure is used in a portable electronic device, an occupied area and installation costs can be reduced.

In addition, one of the first sliding member 110 and the second sliding member 120 may be integrally formed with the primary body, and the other member of the first sliding member 110 and the second sliding member 120 may be integrally formed with the secondary body. In this case, the volume of the sliding structure 100 can be reduced, and thus a thin electronic device, which can smoothly perform a sliding operation, can be realized.

Hereinafter, operations of the sliding structure 100 will be described with reference to the above internal structure of the sliding structure 100.

Figure 5:
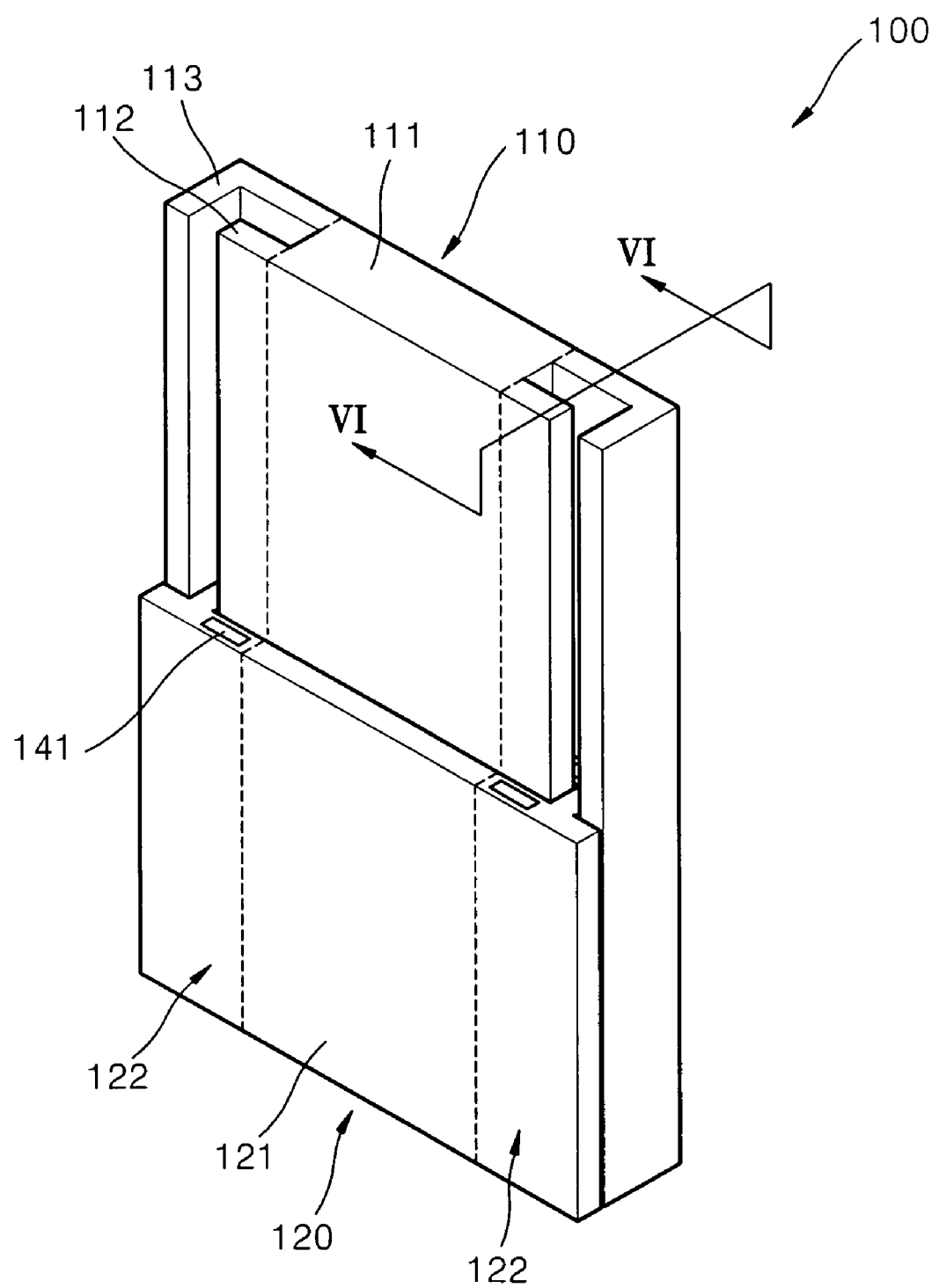
FIG. 5 is a perspective view of the sliding structure illustrated in FIG. 2 in the case where a second sliding member is at a start position, according to an embodiment of the present invention.
Figure 6:
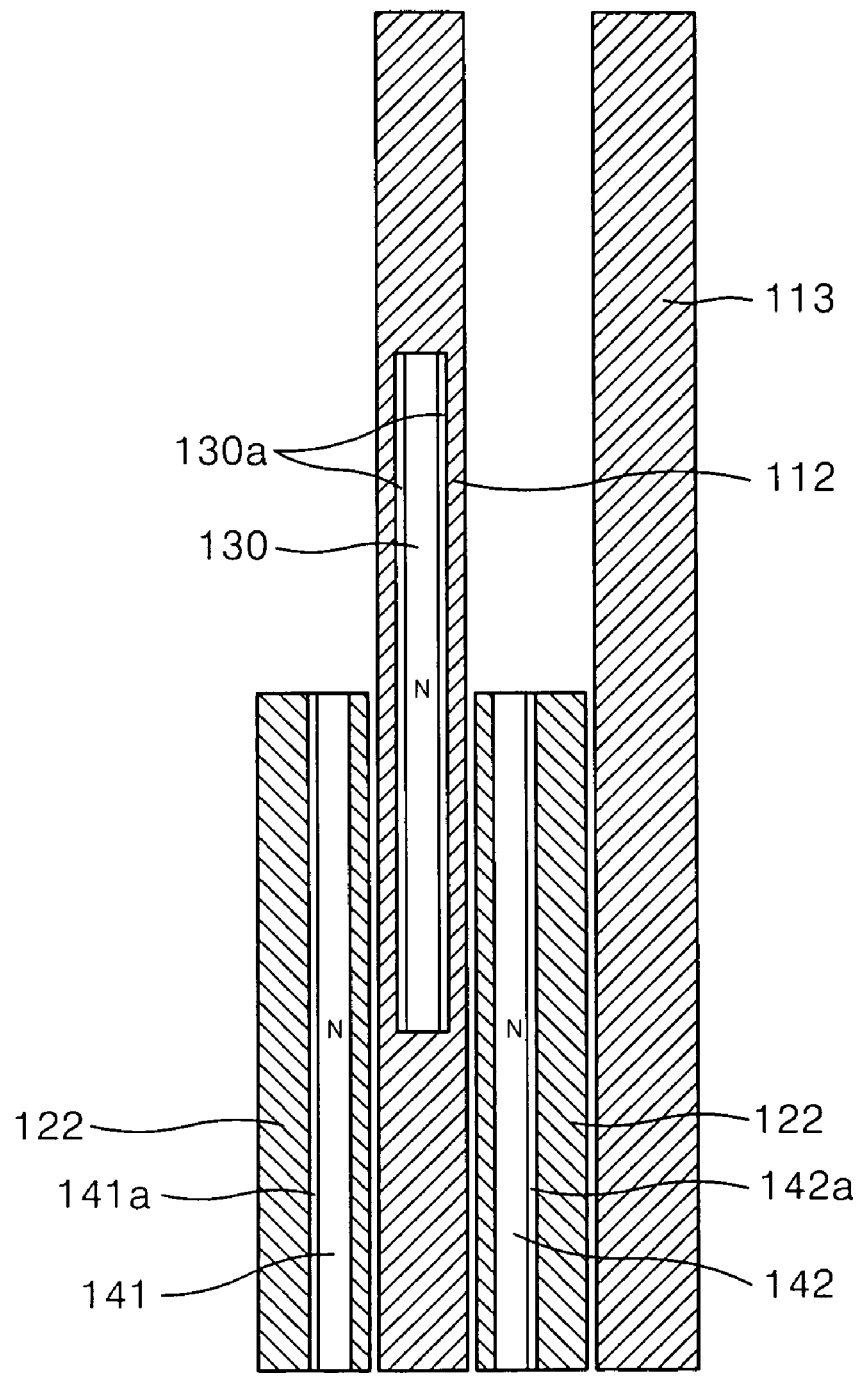
FIG. 6 is a cross-sectional view of the sliding structure taken along a line VI-VI of FIG. 5.
Figure 7:
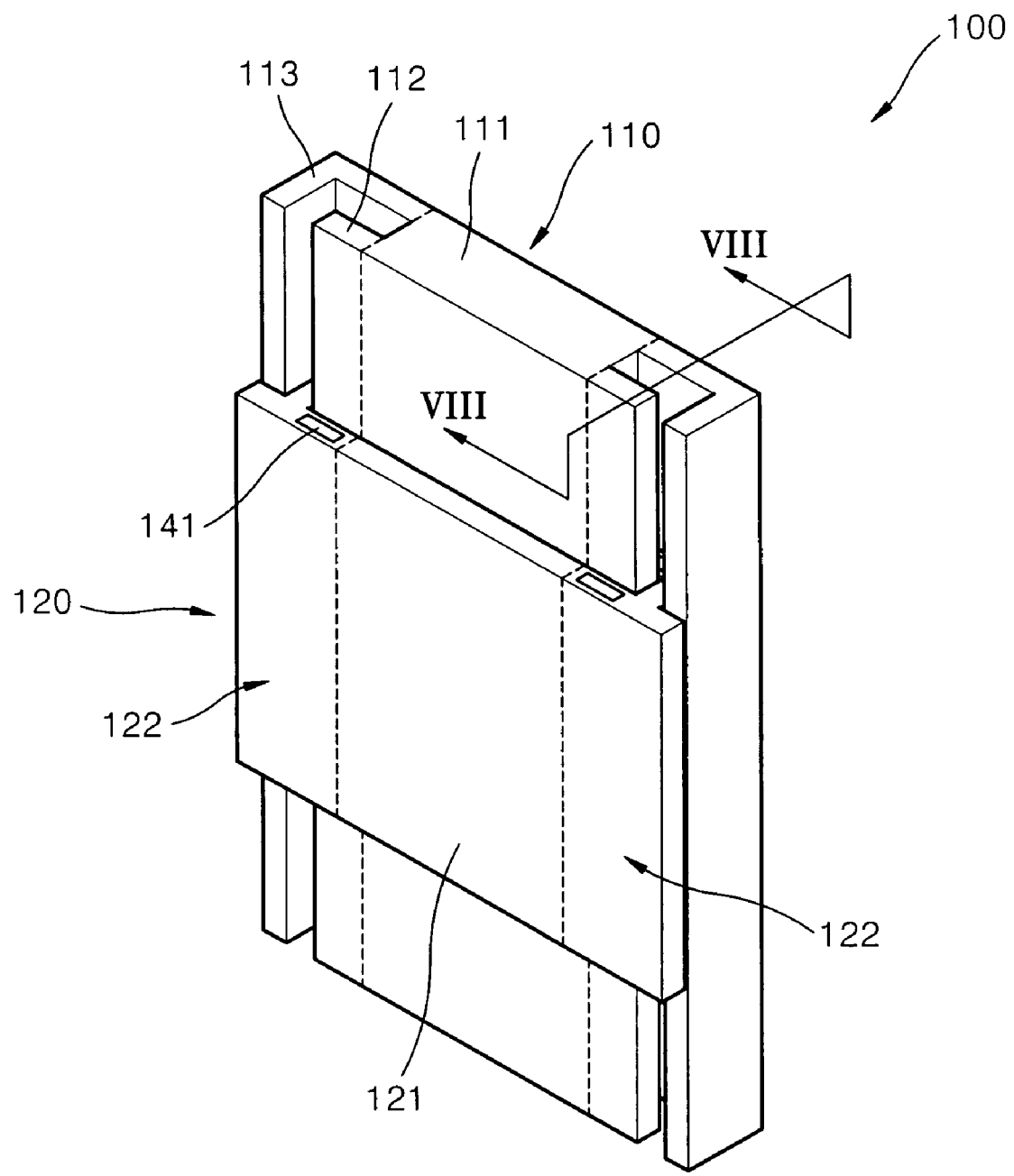
FIG. 7 is a perspective view of a perspective view of the sliding member illustrated in FIG. 2 in the case where the second sliding member is at an intermediate position, according to an embodiment of the present invention.
Figure 8:
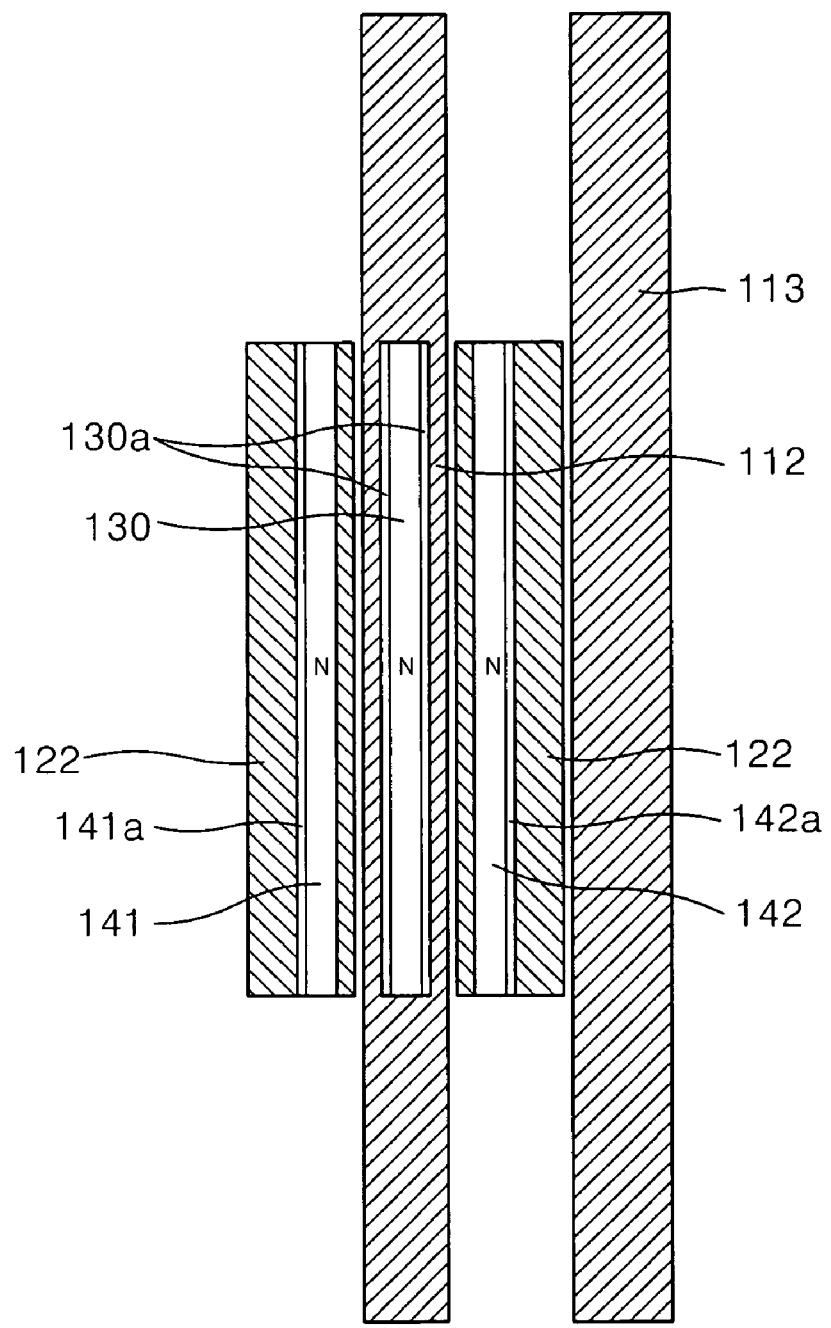
FIG. 8 is a cross-sectional view of the sliding structure 100 taken along a line VIII-VIII of FIG. 7.
Figure 9:
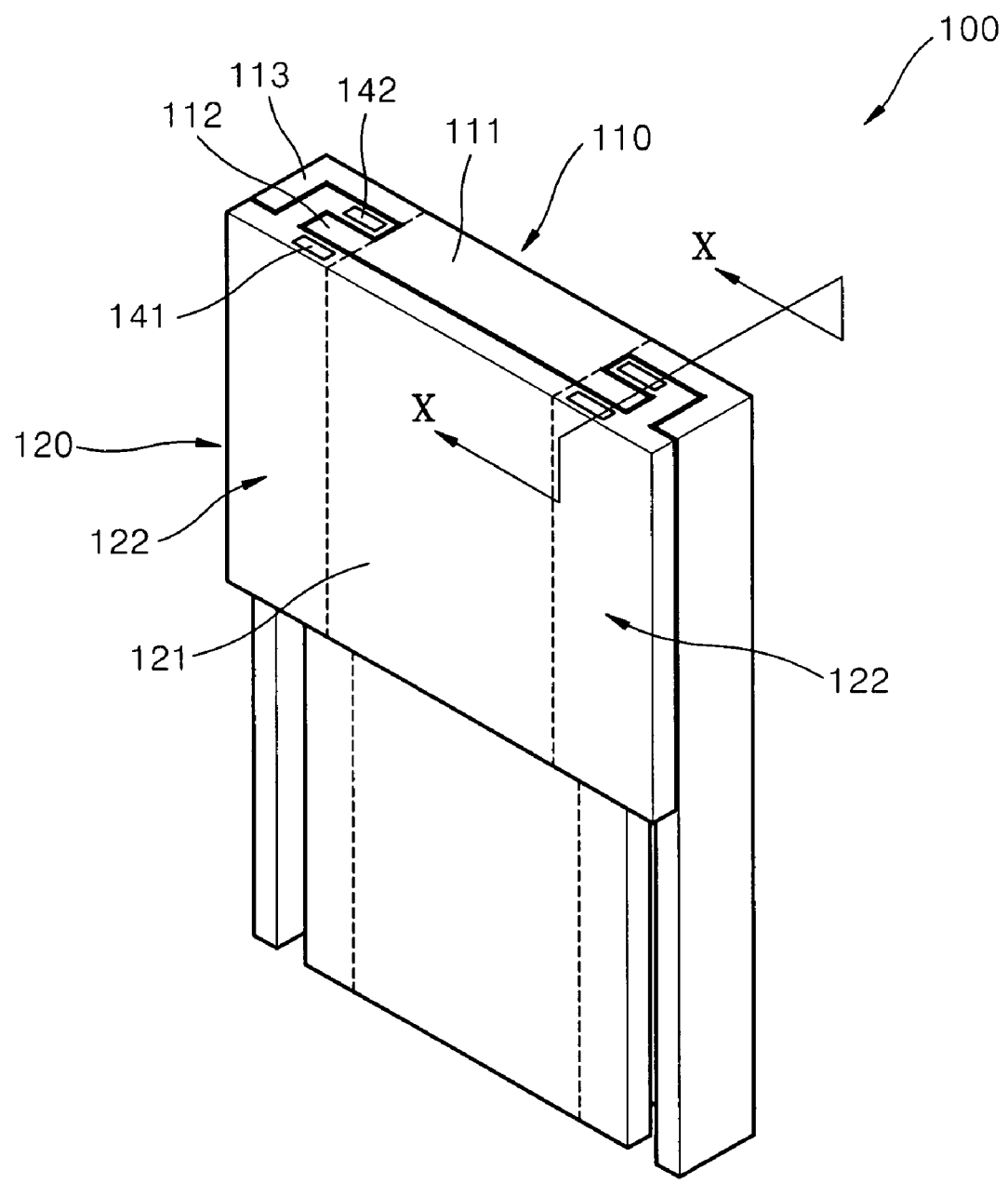
FIG. 9 is a perspective view of the sliding member in the case where a second sliding member is at an end position, according to an embodiment of the present invention.
Figure 10:
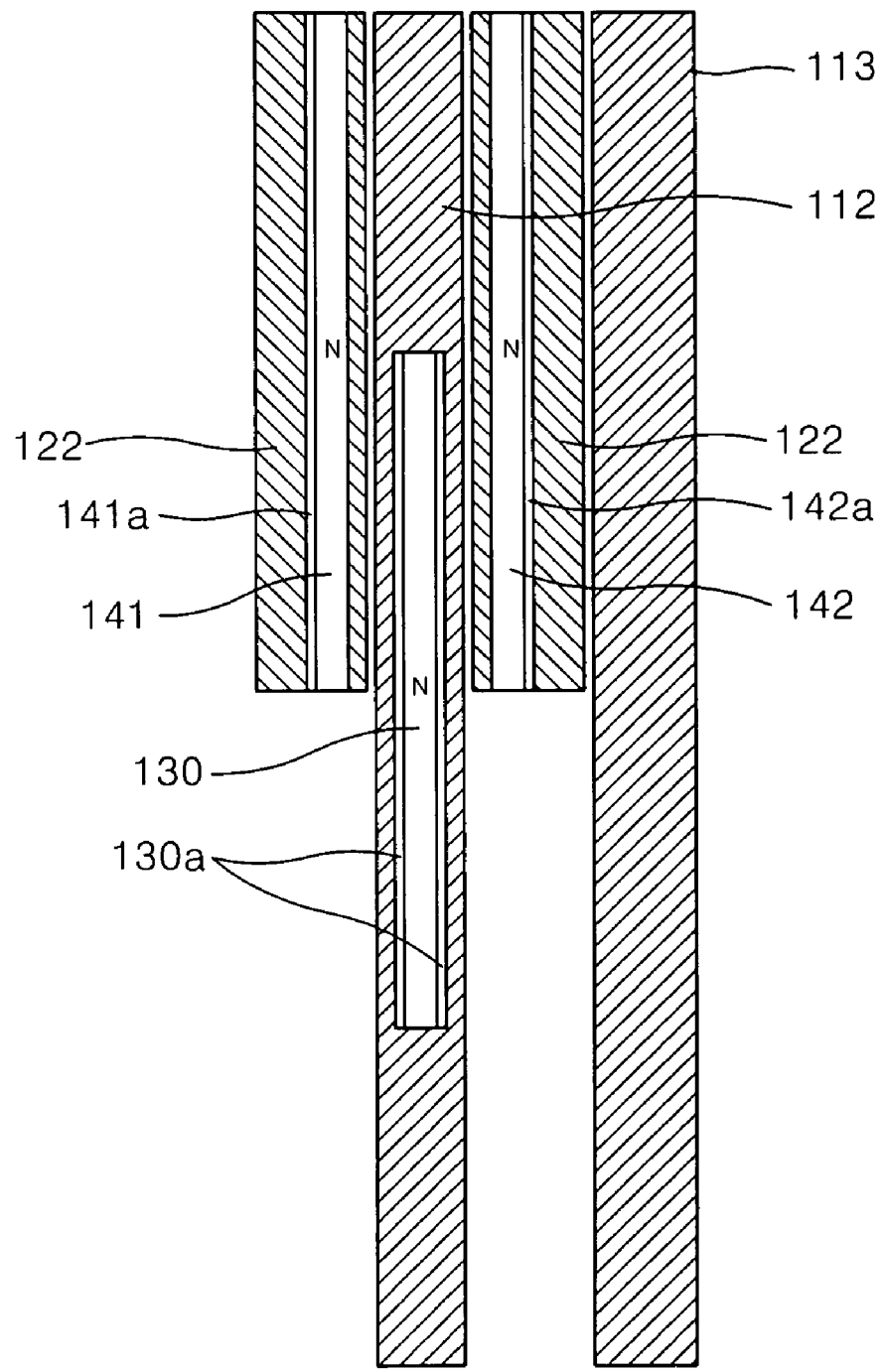
FIG. 10 is a cross-sectional view of the sliding structure taken along a line X-X of FIG. 9.

FIG. 5 is a perspective view of the sliding structure 100 illustrated in FIG. 2 in the case where the second sliding member 120 is at a start position, according to an embodiment of the present invention. FIG. 6 is a cross-sectional view of the sliding structure 100 taken along a line VI-VI of FIG. 5. FIG. 7 is a perspective view of a perspective view of the sliding member 100 illustrated in FIG. 2 in the case where the second sliding member 120 is at an intermediate position, according to an embodiment of the present invention. FIG. 8 is a cross-sectional view of the sliding structure 100 taken along a line VIII-VIII of FIG. 7. FIG. 9 is a perspective view of the sliding member 100 in the case where the second sliding member 120 is at an end position, according to an embodiment of the present invention. FIG. 10 is a cross-sectional view of the sliding structure 100 taken along a line X-X of FIG. 9. Here, FIGS. 6, 8 and 10 are cross-sectional views of the sliding structure 100 in the vicinity of N poles of the first magnet portion 130 and the second magnet portions 141 and 142, according to embodiments of the present invention.

Referring to FIGS. 5 and 6, the second sliding member 120 is at the start position, and the second sliding member 120 is positioned on a lower part of the first sliding member 110. As illustrated in FIG. 6, a part of the first magnet portion 130 is positioned between the second magnet portions 141 and 142. In this case, since each of the second magnet portions 141 and 142, and the first magnet portion 130 are positioned so that the magnetic poles thereof having the same polarity may face each other, a repulsive force acts between each of the second magnet portions 141 and 142, and the first magnet portion 130. In addition, as illustrated in FIGS. 3 and 4, the first magnet portion 130 and each of the second magnet portions 141 and 142 are positioned so that the magnetic poles thereof having the same polarity may face each other, and thus a repulsive force acts between each of the second magnet portions 141 and 142, and the first magnet portion 130.

Accordingly, the second sliding member 120 may be stably positioned at the start position by the repulsive force. In addition, the second sliding member 120 is slightly lifted from the first sliding member 110 due to the repulsive force, and thus sliding friction can be reduced.

When a user pushes up the second sliding member 120 at the position illustrated in FIGS. 5 and 6, an entire part of the first magnet portion 130 is smoothly positioned between the second magnet portions 141 and 142. Then, the repulsive force generated between each of the second magnet portions 141 and 142, and the first magnet portion 130 is gradually increased.

Although the user pushes up the second sliding member 120 at rapid speed, the repulsive force generated between each of the second magnet portions 141 and 142, and the first magnet portion 130 prevents the second sliding member 120 from moving suddenly. Accordingly, an impact on the sliding structure 100 can be reduced in the sliding operation. In addition, since the second sliding member 120 is lifted from the first sliding member 110 due to the repulsive fore, sliding friction can be reduced.

When the user continues to push up the second sliding member 120, the sliding structure 100 reaches the position illustrated in FIGS. 7 and 8. That is, FIG. 7 illustrates the case where the second sliding member 120 is at the intermediate position. Referring to FIG. 7, since most of the first magnet portion 130 is positioned between the second magnet portions 141 and 142, a strong repulsive force acts between each of the second magnet portions 141 and 142, and the first magnet portion 130.

When the user continues to push up the second sliding member 120 at the position illustrated in FIGS. 7 and 8, although a pushing force is not strong, the second sliding member 120 can be pushed up due to the repulsive force generated between each of the second magnet portions 141 and 142, and the first magnet portion 130.

In such a case, an excessive impact on the sliding structure 100 can be prevented. In addition, since the second sliding member 120 is lifted from the first sliding member 110 due to the repulsive force, the sliding friction can be reduced. When the user continues to push up the second sliding member 120, the sliding structure 100 reaches the position illustrated in FIGS. 9 and 10. As shown in FIGS. 9 and 10, a repulsive force acts between the first magnet portion 130, and each of the second magnet portions 141 and 142 due to the arrangement of the magnetic poles of the second magnet portions 141 and 142 and the first magnet portion 130.

Accordingly, the second sliding member 120 can be stably positioned at the end position due to the repulsive force. Since the second sliding member 120 is slightly lifted from the first sliding member 110, when the user again pushes the second sliding member 120 downwards, sliding friction can be reduced.

In this embodiment, the case where the second sliding member 120 is pushed up has been described, but the present invention is not limited to this arrangement. According to the present invention, in the case where the second sliding member 120 that is at the end position illustrated in FIGS. 9 and 10 is pushed downwards, the sliding operation of the sliding structure 100 is performed in the same way except for the sliding direction.

As described above, since the sliding structure 100 has the above structure, an excessive impact, which may occur in the sliding operation, can be prevented. Since one of the first sliding member 110 and the second sliding member 120 may be integrally formed with the primary body, and the other member of the first sliding member 110 and the second sliding member 120 may be integrally formed with the secondary body. In this case, the volume of the sliding structure 100 can be reduced, and thus a thin electronic device, which can smoothly perform a sliding operation, can be realized.

In the sliding structure 100 having the above structure, sliding friction can be reduced, and thus a user can easily operate an electronic device including the sliding structure 100. Also, in the sliding structure 100, since the magnetic poles of the first magnet portion 130 and the second magnet portions 141 and 142 are arranged across the sliding direction, a bar magnet or the like, which has a stable structure, can be used to constitute each of the first magnet portion 130 and the second magnet portions 141 and 142.

Furthermore, in the sliding structure 100, due to the arrangement of the first magnet portion 130 and the second magnet portions 141 and 142, spontaneous demagnetization or thermal demagnetization, which can be generated in a permanent magnet, can be reduced. That is, when a repulsive force continues to act between magnets, and the intensity of one of the magnets is stronger or weaker than the other of the magnets, spontaneous demagnetization or thermal demagnetization can easily occur. In this embodiment, a repulsive force acts between the first magnet portion 130 and the second magnet portions 141 and 142. However, since each of the first magnet portion 130 and the second magnet portions 141 and 142 constitutes a respective magnetic circuit, and the first magnet portion 130 and the second magnet portions 141 and 142 are arranged so that the magnetic poles thereof having the same polarity may face each other, spontaneous demagnetization or thermal demagnetization can be reduced. The sliding structure 100 can be used in a case and a semi-automatic door, which includes at least two sliding members sliding along one another, as well as in an electronic device.

Hereinafter, a sliding structure 200 will be described with reference to FIGS. 11 through 14, according to another embodiment of the present invention, in terms of differences therein compared to the above-described embodiment.

Figure 11:
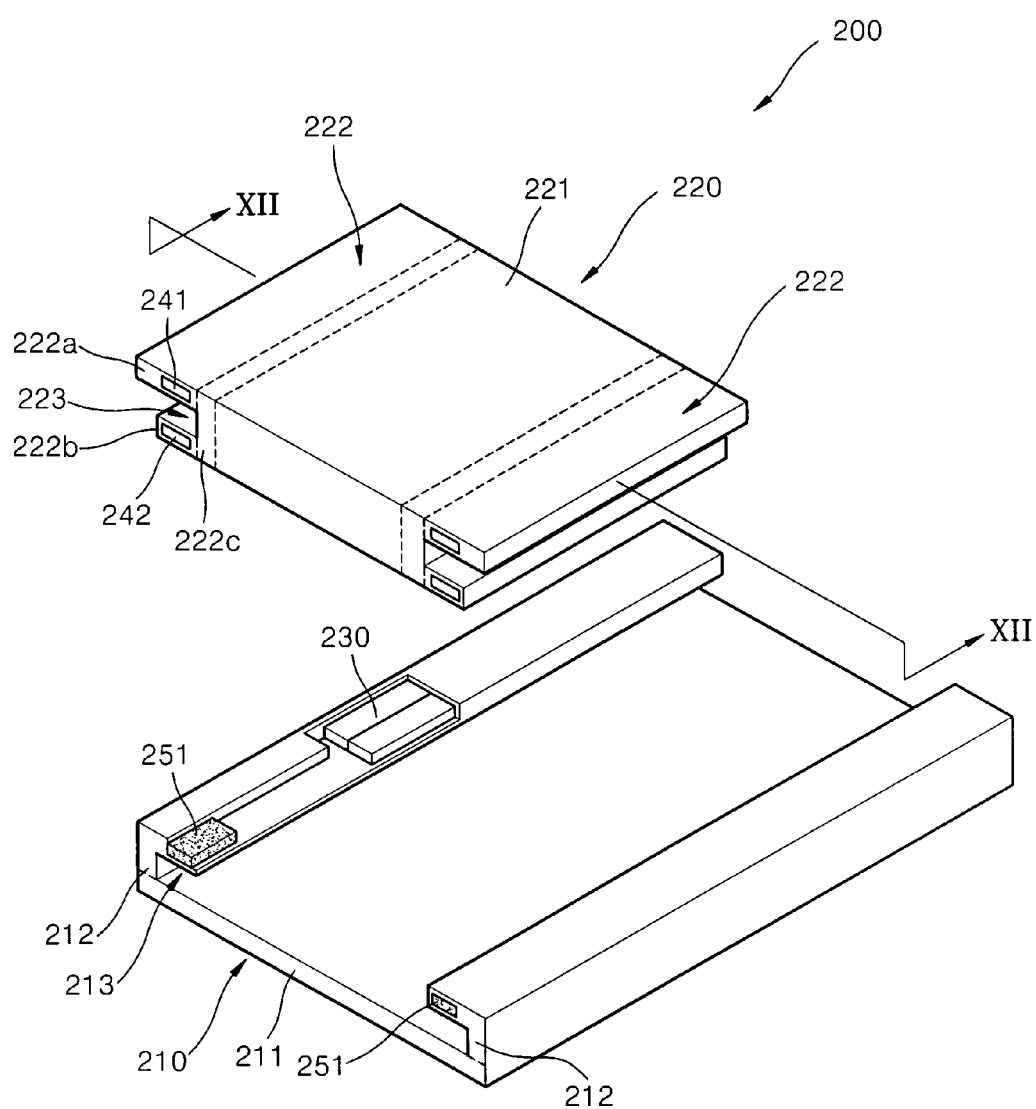
FIG. 11 is a perspective view of an example of a sliding structure according to another embodiment of the present invention.
Figure 12:
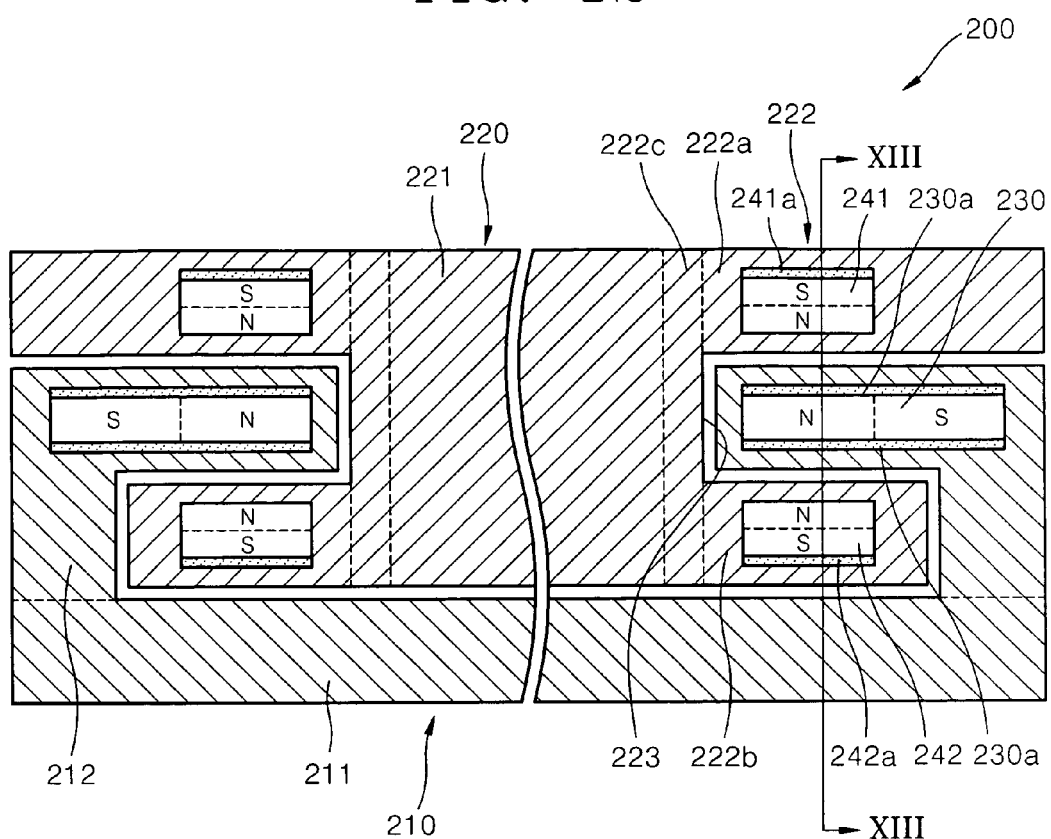
FIG. 12 is a cross-sectional view of the sliding structure taken along a line XII-XII of FIG. 11.
Figure 13:
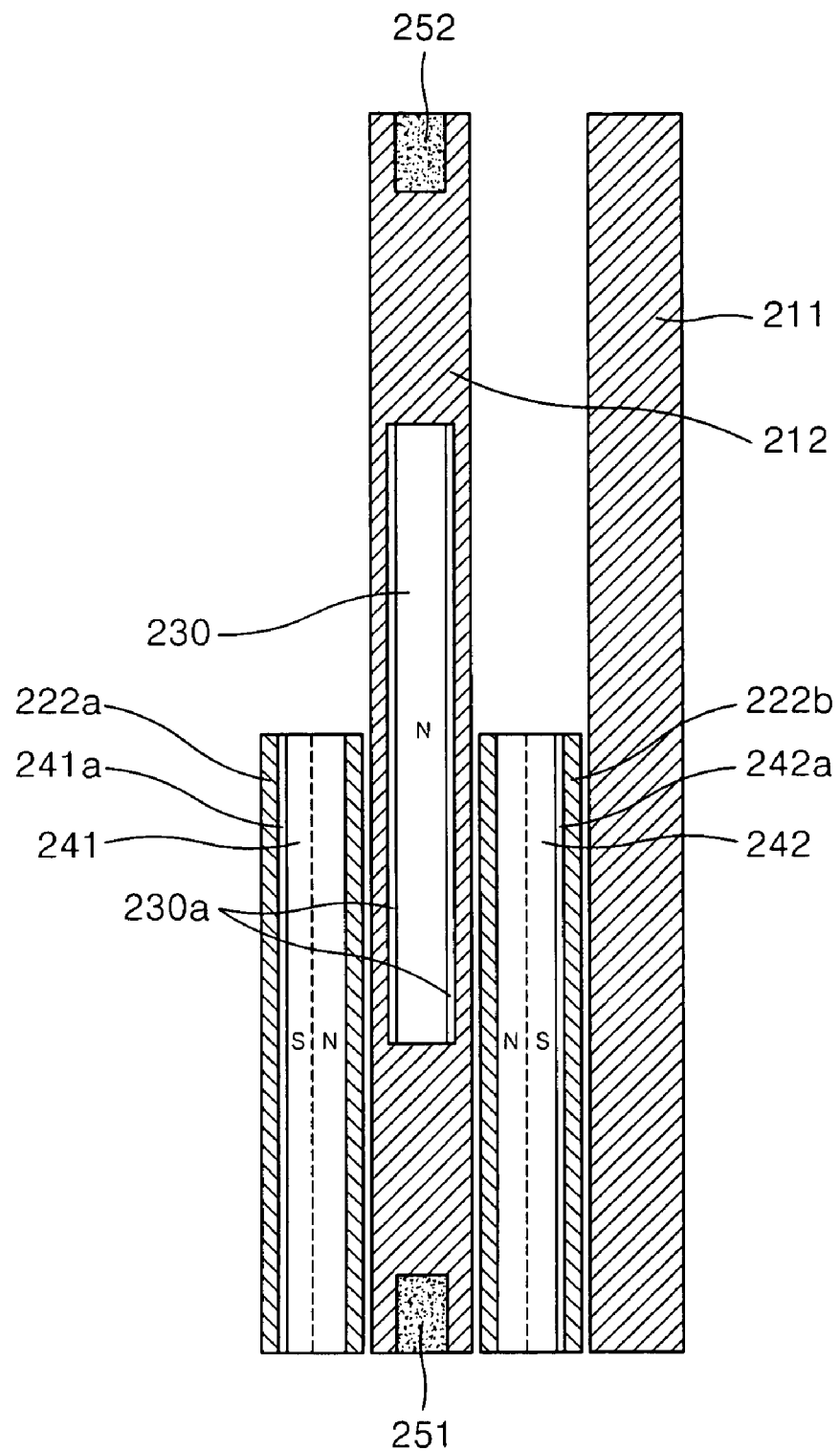
FIG. 13 is a cross-sectional view of the sliding structure taken along a line XIII-XIII of FIG. 12.
Figure 14:
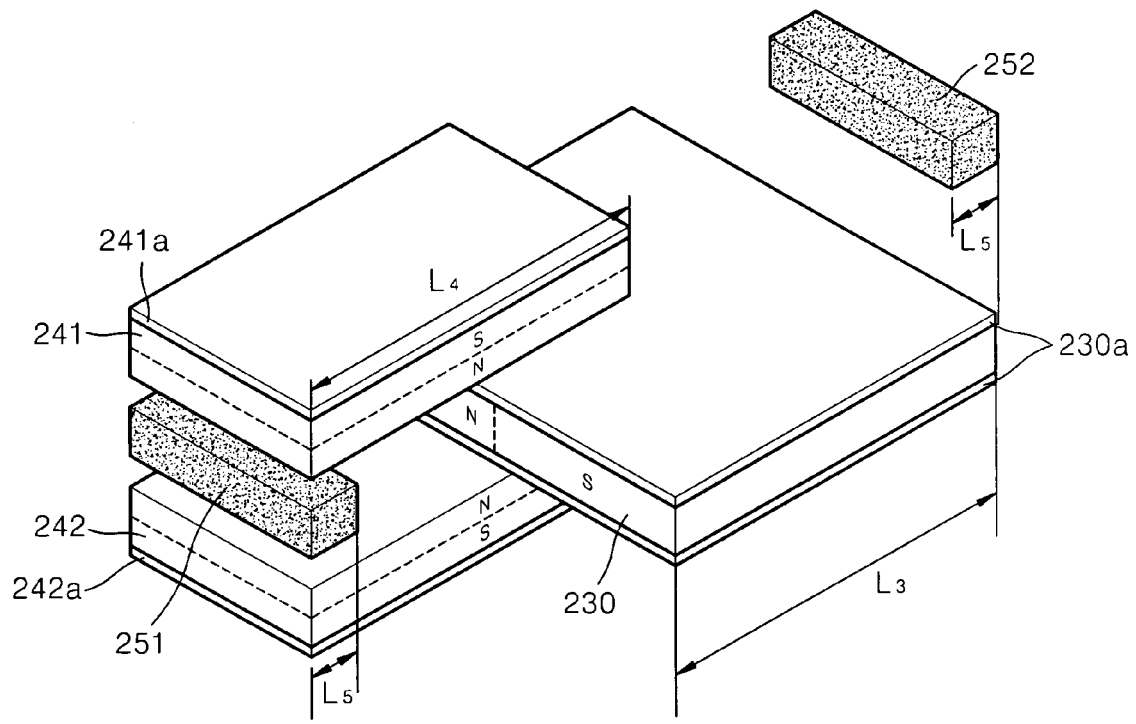
FIG. 14 is a schematic perspective view illustrating the arrangement of a first magnet portion and second magnet portions, according to the embodiment of the present invention shown in FIG. 11.

FIG. 11 is a perspective view of the sliding structure 200 according to another embodiment of the present invention. FIG. 12 is a cross-sectional view of the sliding structure 200 taken along a line XII-XII of FIG. 11. FIG. 13 is a cross-sectional view of the sliding structure 200 taken along a line XIII-XIII of FIG. 12. FIG. 14 is a schematic perspective view illustrating the arrangement of the first magnet portion 230 and the second magnet portions 241 and 242, according to another embodiment of the present invention.

Referring to FIGS. 11 and 12, the sliding structure 200 includes a first sliding member 210, a second sliding member 220, the first magnet portion 230 and the second magnet portions 241 and 242.

The first sliding member 210 is formed of a non-magnetic material such as a plastic resin, an aluminum alloy, a magnesium alloy, or the like.

The first sliding member 210 includes a support portion 211 and a guide portion 212. The support portion 211 has a flat or substantially flat shape, and the guide portion 212 extends from two sides of the support portion 211.

The support portion 211 has a flat or substantially flat shape, but the present invention is not limited thereto. That is, according to the present invention, the support portion 211 may be configured as a protective cover, which protects a circuit board including components mounted thereon, or as a frame supporting a circuit board. The shape of the guide portion 212 has a ⌐ or substantially ⌐ shape, and a first receiving groove 213 is defined by the guide portion 212 and the support portion 211.

The material of the second sliding member 220 is the same as that of the first sliding member 210, and the second sliding member 220 includes a base portion 221 and a receiving portion 222.

The first sliding member 210 and the second sliding member 220 are formed of a non-magnetic material such as a plastic resin, an aluminum alloy, a magnesium alloy, or the like, but the present invention is not limited to these materials. That is, according to the present invention, the first sliding member 210 and the second sliding member 220 may be formed of any material. For example, the first sliding member 210 and the second sliding member 220 may be formed of a ferromagnetic material such as a tin steel plate or stainless steel.

The base portion 221 has a flat or substantially flat shape, and the receiving portion 222 extends from two sides of the base portion 221. The receiving portion 222 has a ⌐ or substantially "⊏" shape, and includes a first receiving portion 222a, a second receiving portion 222b and a connection portion 222c. The first receiving portion 222a and the second receiving portion 222b are disposed parallel or substantially parallel to each other. The connection portion 222c connects the first receiving portion 222a to the second receiving portion 222b, and is integrally formed with the base portion 221.

A second receiving groove 223 is defined by the first receiving portion 222a, the second receiving portion 222b and the connection portion 222c. Since the guide portion 212 is inserted into the second receiving groove 223 when the sliding structure 200 is assembled, the second guide portion 212 functions as a sliding guider. Also, since the second receiving portion 222b, which is a part of elements defining the receiving portions 222, is inserted into the first receiving groove 213 when the sliding structure 200 is assembled, the second receiving portion 222b functions as a sliding guider.

The first magnet portion 230 is embedded in the guide portion 212. The second magnet portions 241 and 242 are respectively embedded in the second receiving portion 222b and the first receiving portion 222a. The first magnet portion 230 has a square or substantially square shape, and magnetic poles of the first magnet portion 230 are arranged across a sliding direction.

As illustrated in FIGS. 11, 13 and 14, a pair of ferromagnetic members 251 and 252 are embedded in the guide portion 212, and the first magnet portion 230 is disposed between the ferromagnetic members 251 and 252. The ferromagnetic members 251 and 252 are formed of a ferromagnetic material such as steel or any other suitable material. Each of the ferromagnetic members 251 and 252 has a square or substantially square shape, and is spaced apart from the first magnet portion 230.

Each of the ferromagnetic members 251 and 252 has a square or substantially square shape, but the present invention is not limited to this arrangement. That is, the ferromagnetic members 251 and 252 may have various shapes such as a disk type, or the like.

The ferromagnetic members 251 and 252 are configured to be a pair, but the present invention is not limited thereto. That is, the number of the ferromagnetic members 251 and 252 in not limited to 2. For example, only one of the ferromagnetic members 251 and 252 may be disposed in one side of the first magnet portion 230, and three or more ferromagnetic members may be disposed in one side or both sides of the first magnet portion 230.

The ferromagnetic members 251 and 252 each have a length "$L_5$", which may be smaller than a length "$L_3$" of the first magnet portion 230, but the present invention is not limited to this arrangement. That is, according to the present invention, the ferromagnetic members 251 may each have any length.

The ferromagnetic members 251 and 252 facilitate a stable sliding operation. That is, an attractive force acts between each of the second magnet portions 241 and 242, and each of the ferromagnetic members 251 and 252, and thus a stable sliding operation can be realized, which will be described later.

The second magnet portions 241 and 242 are embedded in the receiving portion 222. The second magnet portions 241 and 242 may each be a permanent magnet, but the present invention is not limited to this arrangement. That is, according to the present invention, the second magnet portions 241 and 242 may each be electromagnet, or the like.

Each of the second magnet portions 241 and 242 has a square or substantially square shape. The second magnet portions 241 and 242 are respectively embedded in the first receiving portion 222a and the second receiving portion 222b, and the first magnet portion 230 is disposed between the second magnet portions 241 and 242. Thus, the second magnet portions 241 and 242 operate in conjunction with the first magnet portion 230.

The second magnet portions 241 and 242 are arranged so that the magnetic poles thereof may be arranged perpendicular to the sliding direction and may be opposite to each other. That is, as illustrated in FIGS. 12 and 14, a second magnet portion 241 is disposed so that the S pole and N pole respectively correspond to an upper part and a lower part thereof, and a second magnet portion 242 is disposed so that the N pole and the S pole respectively correspond to an upper part and a lower part thereof. The magnetic poles of the second magnet portions 241 and 242 are disposed so that the N pole of the first magnet portion 230 may be disposed between the N poles of the second magnet portions 241 and 242, and thus a repulsive force acts between each of the second magnet portions 241 and 242, and the first magnet portion 230, in order to facilitate a sliding operation.

A length "$L_4$" of each of the second magnet portions 241 and 242 is equal to a length "$L_3$" of the first magnet portion 230, but the present invention is not limited thereto. That is, the length "$L_4$" of each of the second magnet portions 241 and 242 may be longer or shorter than the length "$L_3$" of the first magnet portion 230.

A magnetic shield 230a is disposed on an upper surface and a lower surface of the first magnet portion 230. Magnetic shields 241a and 242a are respectively disposed on an upper surface of the second magnet portion 241 and a lower surface of the second magnet portion 242.

The magnetic shield 230a, and the magnetic shields 241a and 242a shield against the magnetic lines of force generated by the first magnet portion 230, and the second magnet portions 241 and 242, respectively, and may be formed of a non-magnetic material, which is a material shielding against magnetic lines of force, or alternately, may be formed of a ferromagnetic substance such as an AD-MU alloy, a tin steel plate or the like.

The magnetic shield 230a is disposed on the first magnet portion 230, but the present invention is not limited thereto. That is, according to the present invention, the magnetic shield 230a may not be necessary, according to the shapes of the guide portion 212 and the receiving portion 222.

In the sliding structure 200, one of the first sliding member 210 and the second sliding member 220 is embedded in a primary body in which a main chip set of an electronic device such as a cellular phone, a camera, a portable multimedia player (PMP) or the like, and an electric portion such as a battery are integrated, and the other member of the first sliding member 210 and the second sliding member 220 is embedded in a secondary body having a relatively simple structure. Accordingly, the sliding operation of the sliding structure 200 is performed.

In addition, one of the first sliding member 210 and the second sliding member 220 may be integrally formed with the primary body, and the other member of the first sliding member 210 and the second sliding member 220 may be integrally formed with the secondary body. In this case, the volume of the sliding structure 200 can be reduced, and thus a thin electronic device, which can smoothly perform a sliding operation, can be realized.

The sliding operation of the sliding structure 200 is similar to the sliding operation of the sliding structure 100, which has been described above. However, since the sliding structure 200 includes the ferromagnetic members 251 and 252, the second sliding member 220 can be stably positioned due to an attractive force between each of the second magnet portions 241 and 242, and each of the ferromagnetic members 251 and 252, at the start position and the end position of a sliding position of the second sliding member 220, in which the ferromagnetic members 251 and 252 are positioned between the second magnet portions 241 and 242.

That is, as illustrated in FIG. 13, when one side of the first magnet portion 230 is positioned between edges of the second magnet portions 241 and 242, the other side of the first magnet portion 230 may be inclined. In this case, an attractive force acts between each of the second magnet portions 241 and 242 and the ferromagnetic member 251, and thus the first magnet portion 230 can be maintained parallel or substantially parallel to the sliding direction. Accordingly, entire magnetic levitation can be maintained. In addition, since the attractive force acts between the second magnet portions 241 and 242, and each of the ferromagnetic members 251 and 252, an impact can be reduced at the end position.

During the sliding operation of the second sliding member 220, the sliding operation of the second sliding member 220 can be performed more easily due to the attractive force between each of the second magnet portions 241 and 242, and each of the ferromagnetic members 251 and 252. For example, when the second sliding member 220 is pushed up from an intermediate position to an end position, a repulsive force acts between each of the second magnet portions 241 and 242, and the first magnet portion 230, and an attractive force acts between each of the second magnet portions 241 and 242, and the ferromagnetic member 252. Thus, although the pushing force is not strong, the second sliding member 220 can be pushed up.

As described above, since the sliding structure 200 does not include the auxiliary receiving portion 113, which is included in the sliding structure 100, the structure of the sliding structure 200 can be simplified, and can be easily manufactured. Also, since the sliding structure 200 includes the ferromagnetic members 251 and 252, the sliding operation can be easily performed due to the attractive force between each of the second magnet portions 241 and 242, and each of the ferromagnetic members 251 and 252. Since the construction, operation and advantage of the sliding structure 200 are the same or substantially the same as those of the sliding structure 100 except for the above-described descriptions, their detailed descriptions will be omitted here.

Figure 15:
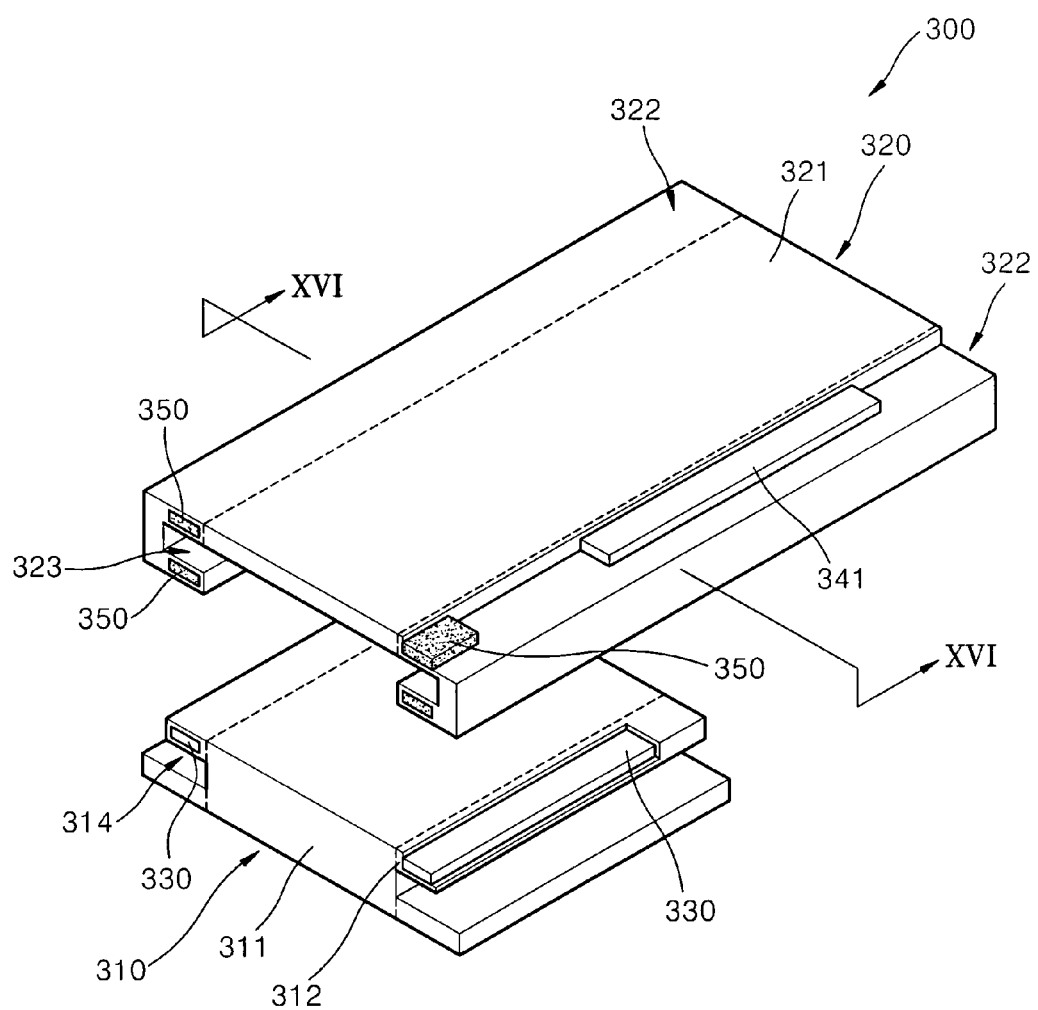
FIG. 15 is a perspective view of an example of a sliding structure according to another embodiment of the present invention.
Figure 16:
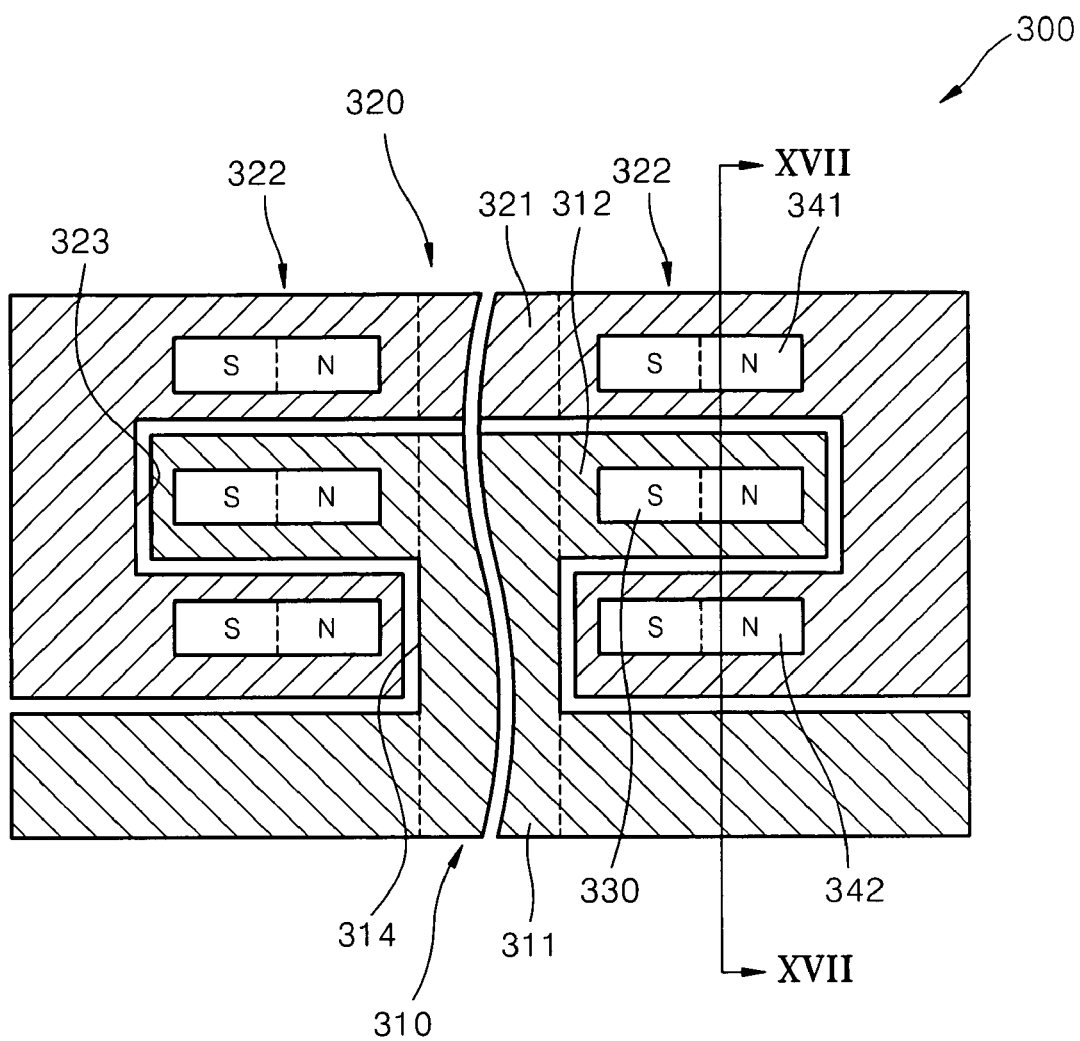
FIG. 16 is a cross-sectional view of the sliding structure taken along a line XVI-XVI of FIG. 15.
Figure 17:
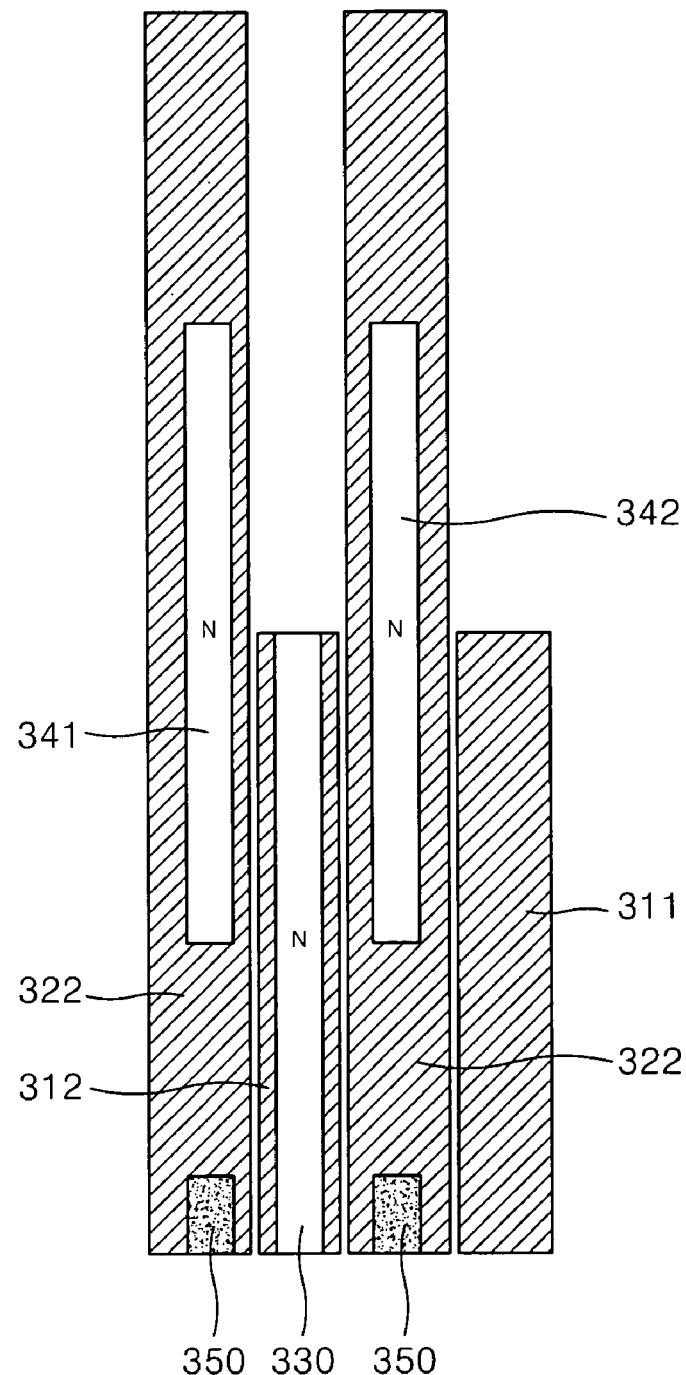
FIG. 17 is a cross-sectional view of the sliding structure taken along a line XVII-XVII of FIG. 16.

Hereinafter, a sliding structure 300 will be described with reference to FIGS. 15 through 17, according to another embodiment of the present invention, in terms of differences from the above-described embodiment. FIG. 15 is a perspective view of the sliding structure 300 according to another embodiment of the present invention. FIG. 16 is a cross-sectional view of the sliding structure 300 taken along a line XVI-XVI of FIG. 15. FIG. 17 is a cross-sectional view of the sliding structure 300 taken along a line XVII-XVII of FIG. 16.

Referring to FIGS. 15 and 16, the sliding structure 300 includes a first sliding member 310, a second sliding member 320, a first magnet portion 330, and second magnet portions 341 and 342. The first sliding member 310 is formed of a non-magnetic material such as a plastic resin, and includes a support portion 311 and a guide portion 312. The support portion 311 has a flat or substantially flat shape, and the guide portion 312 extends from two sides of the support portion 311. The second sliding member 320 includes a base portion 321 and a receiving portion 322. The length of the second sliding member 320 is longer than the length of the first sliding member 310, unlike the second sliding member 120.

The base portion 321 has a flat or substantially flat shape, and is formed of a non-magnetic material such as a plastic resin or any other suitable material.

The receiving portion 322 extends from two sides of the base portion 321. Since the receiving portion 322 is formed of a ferromagnetic material, the receiving portion 322 shields against magnetic lines of force generated by the first magnet portion 330, and the second magnet portions 341 and 342. That is, since the receiving portion 322 is formed of a ferromagnetic material shielding against magnetic lines of force, the receiving portion 322 can shield against magnetic lines of force generated by the first magnet portion 330 of the guide portion 312 inserted into the receiving portion 322, as well as against magnetic lines of force generated by the second magnet portions 341 and 342 embedded in the receiving portion 322.

The whole of the receiving portion 322 is formed of a ferromagnetic material, but the present invention is not limited to this arrangement. That is, only a part of the receiving portion 322, on which the second magnet portions 341 and 342 are disposed, may be formed of a ferromagnetic substance, and the other part of the receiving portion 322 may be formed of a non-magnetic material.

The receiving portion 322 has a ⊏ or substantially ⊏ shape, and a second receiving groove 323 is formed inside the receiving portion 322. Since the guide portion 312 is inserted into the second receiving groove 323 when the sliding structure 300 is assembled, the guide portion 312 functions as a sliding guider. In addition, since a part of the receiving portion 322 is inserted into the first receiving groove 314 when the sliding structure 300 is assembled, the receiving portion 322 functions as a sliding guider.

The first magnet portion 330 is embedded in the guide portion 312. The first magnet portion 330 has a square or substantially square shape, and magnetic poles of the first magnet portion 330 are arranged across the sliding direction.

An arrangement of the magnetic poles of the first magnet portion 330 is the same as that of magnetic poles of each of the second magnet portions 341 and 342, which correspond to the magnetic poles of the first magnetic portion 330, and thus the first magnet portion 330, and each of the second magnet portions 341 and 342 are arranged so that the magnetic poles thereof having the same polarity may face each other during the sliding operation. The second magnet portions 341 and 342 are configured to be a pair. The second magnet portions 341 and 342 are embedded in the receiving portion 322, wherein the guide portion 312 is disposed between the second magnet portions 341 and 342.

The second magnet portions 341 and 342 are embedded in the receiving portion 322, but the present invention is not limited to this arrangement. That is, the second magnet portions 341 and 342 may be mounted on a surface of the receiving portion 322 of each of the second magnet portions 341 and 342.

Each of the second magnet portions 341 and 342 has a square or substantially square shape. The magnetic poles of each of the second magnet portions 341 and 342 are arranged across the sliding direction, as the magnetic poles of the first magnet portion 330 are arranged across the sliding direction.

Since an arrangement of the magnetic poles of each of the second magnet portions 341 and 342 is the same as that of the magnetic poles of the first magnet portion 330, a repulsive force acts between each of the second magnet portions 341 and 342, and the first magnet portion 330. That is, the magnetic poles of the second magnet portions 341 and 342 are disposed so that the repulsive force may act between each of the second magnet portions 341 and 342, and the first magnet portion 330, thereby facilitating a sliding operation due to magnetic levitation.

As illustrated in FIGS. 15 and 17, a ferromagnetic member 350 is disposed in an end of the receiving portion 322. The ferromagnetic member 350 is formed of a ferromagnetic material such as steel, has a square or substantially square shape, and is spaced apart from the second magnet portions 341 and 342.

The ferromagnetic member 350 facilitates a stable sliding structure. That is, since an attractive force acts between the first magnet portion 330 and the ferromagnetic member 350, like in the case of the ferromagnetic members 251 and 252, a sliding operation can be easily performed. The advantage of the ferromagnetic member 350 is the same as that of the ferromagnetic members 251 and 252, which has been described above.

The ferromagnetic member 350 is disposed in an end of the receiving portion 322, but the present invention is not limited to this arrangement. That is, the ferromagnetic member 350 may be disposed in the other end of the receiving portion 322, like in the case of the ferromagnetic members 251 and 252.

In the sliding structure 300, one of the first sliding member 310 and the second sliding member 320 is embedded in a primary body in which a main chip set of an electronic device such as a cellular phone, a camera, a PMP or the like, and an electrical portion such as a battery are integrated, and the other member of the first sliding member 310 and the second sliding member 320 is embedded in a secondary body having a relatively simple structure. Accordingly, the sliding operation of the sliding structure 300 is performed.

In addition, one of the first sliding member 310 and the second sliding member 320 may be integrally formed with the primary body, and the other member of the first sliding member 310 and the second sliding member 320 may be integrally formed with the secondary body. In such a case, the volume of the sliding structure 300 can be reduced, and thus a thin electronic device, which can smoothly perform a sliding operation, can be realized.

The sliding operation of the sliding structure 300 is similar to the sliding operation of the sliding structure 100, which has been described above. However, since the size of the first sliding member 310 is smaller than that of the second sliding member 320, the first sliding member 310 can be more easily moved than the second sliding member 320.

As described above, since the sliding structure 300 does not include the auxiliary receiving portion 113, which is included in the sliding structure 100, the structure of the sliding structure 300 can be simplified, and can be easily manufactured. Since the sliding structure 300 includes the ferromagnetic member 350, the sliding operation can be easily performed due to an attractive force between the first magnet portion 330 and the ferromagnetic member 350.

In the sliding structure 300, the receiving portion 322 is longer than the guide portion 312, and the receiving portion 322 is formed of a ferromagnetic substance. Thus, the guide portion 312 can slide in the receiving portion 322 in a magnetic levitation state, and magnetic lines of force generated by the first magnet portion 330, and the second magnet portions 341 and 342 can be effectively shielded against without an additional magnetic shield.

In addition, when the sliding structure 300 is used in a small-sized electronic device such as a cellular phone, the receiving portion 322 is mounted on a sliding portion having a relatively simple technological structure, and the guide portion 312 is mounted on a primary body. Thus, technological structures sliding along each other can be realized by using the primary body having a minimized size.

In the sliding structure 300, magnets are disposed in the guide portion 312 and the receiving portion 322, which are generally necessary so that members included in the sliding structure 300 may slide along each other, and thus sliding friction can be minimized, the structure of the sliding structure 300 can be simplified, and an additional installation area is not necessary, although the members slides semi-automatically or automatically. Since the construction, operation and advantage of the sliding structure 300 are the same as those of the sliding structure 100 except for the additional descriptions given above, their detailed descriptions will be omitted here.

As described above, in a sliding structure according to the present invention, a thin electronic device can be realized. In addition, sliding friction can be reduced during a sliding operation, and thus a user can easily operate an electronic device including the sliding structure, and a sliding stroke can be increased.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A sliding structure for an electronic device, the sliding structure comprising:
   a first sliding member comprising at least one guide portion;
   a second sliding member comprising a receiving portion receiving the guide portion so as to slide along the first sliding member;
   a first magnet portion disposed in the guide portion, wherein north and south magnetic poles of a single flat magnet of the first magnet portion are arranged across a sliding direction; and
   a second magnet portion disposed proximate to the receiving portion so that a repulsive force can act between the first magnet portion and the second magnet portion; wherein: the receiving portion has a substantially three-sided cross-sectional shape and two sides comprise magnets of the second magnet portion that face each other and a non-magnetic third side completing the three-sided shape; and magnetic poles of each of the magnets of the second magnet portion are arranged across a sliding direction.

2. The sliding structure of claim 1, wherein the first magnet portion and the second magnet portions are positioned so that magnetic poles of the first magnet portion and the second magnet portions, which have the same polarity, face each other, and thus a repulsive force acts between the first magnet portion and the second magnet portions.

3. The sliding structure of claim 1, wherein second magnet portion is configured to be a pair of second magnet portions that face each other, and magnetic poles of the second magnet portions are arranged perpendicular to a sliding direction, and opposite to each other, and thus a repulsive force acts with respect to one of magnetic poles of the first magnet portion.

4. The sliding structure of claim 1, wherein the first magnet portion and the second magnet portion are disposed so that a line perpendicular to facing surfaces of the second magnet portion, passes through at least a part of the first magnet portion throughout an entire sliding operation.

5. The sliding structure of claim 1, wherein when a length between the first magnet portion and the second magnet portion is at a maximum, the first magnet portion and the second magnet portion are disposed so that a repulsive force is generated between the first magnet portion and the second magnet portion during a sliding operation of the sliding structure.

6. The sliding structure of claim 1, further comprising:
at least one ferromagnetic member disposed on the guide portion and spaced apart from the first magnet portion in a direction substantially parallel to a sliding direction.

7. The sliding structure of claim 1, further comprising:
at least one ferromagnetic member disposed in the receiving portion and spaced apart from the second magnet portion in a direction parallel to a sliding direction.

8. The sliding structure of claim 1, further comprising:
a magnetic shield disposed in the receiving portion.

9. The sliding structure of claim 1, further comprising:
a magnetic shield disposed on at least a part of a surface of the second magnet portion.

10. The sliding structure of claim 1, wherein the first magnet portion comprises a plurality of magnets.

11. The sliding structure of claim 1, wherein the second magnet portion comprises a plurality of magnets.

12. The sliding structure of claim 1, wherein at least a part of the receiving portion is formed of a ferromagnetic substance.

13. The sliding structure of claim 1, wherein the first sliding member has a first length in the sliding direction and the second sliding member has a second length in the sliding direction, with the second length being shorter than the first length.

14. The sliding structure of claim 13, wherein the receiving portion comprises a groove having an opening facing inward of the second sliding member.

15. The sliding structure of claim 13, wherein the receiving portion comprises a groove having an opening facing outward of the second sliding member.

16. The sliding structure of claim 1, wherein the first sliding member comprises a plurality of said guide portions and the second sliding member comprises a plurality of said receiving portions, each receiving a respective one of said guide portions.

17. The sliding structure of claim 1, wherein the first sliding member has a first length in the sliding direction and the second sliding member has a second length in the sliding direction, with the second length being longer than the first length.

18. The sliding structure of claim 17, wherein the receiving portion comprises a groove having an opening facing inward of the second sliding member.

19. The sliding structure of claim 1, wherein the first magnetic portion is surrounded on its four length-wise surfaces by a non-magnetic material.

* * * * *